(12) United States Patent
Davis

(10) Patent No.: US 11,777,272 B2
(45) Date of Patent: Oct. 3, 2023

(54) MULTIPLEXING FIBER AMPLIFIED WAVEFORMS

(71) Applicant: Booz Allen Hamilton Inc., McLean, VA (US)

(72) Inventor: James A Davis, San Diego, CA (US)

(73) Assignee: Booz Allen Hamilton Inc., McLean, VA (US)

( * ) Notice: Subject to any disclaimer, the term of this patent is extended or adjusted under 35 U.S.C. 154(b) by 329 days.

(21) Appl. No.: 17/020,913

(22) Filed: Sep. 15, 2020

(65) Prior Publication Data
US 2021/0135421 A1  May 6, 2021

Related U.S. Application Data

(60) Provisional application No. 62/929,073, filed on Oct. 31, 2019.

(51) Int. Cl.
*H01S 3/10* (2006.01)
*H01S 3/067* (2006.01)
(Continued)

(52) U.S. Cl.
CPC .............. *H01S 3/10* (2013.01); *H01S 3/0085* (2013.01); *H01S 3/06716* (2013.01); *H01S 3/06754* (2013.01); *H01S 3/1003* (2013.01); *H01S 3/10015* (2013.01); *H01S 3/1301* (2013.01); *H01S 3/1305* (2013.01);
(Continued)

(58) Field of Classification Search
CPC ...... H01S 3/10; H01S 3/0085; H01S 3/06716; H01S 3/06754; H01S 3/10015; H01S 3/1003; H01S 3/1301; H01S 3/1305; H01S 3/1307
See application file for complete search history.

(56) References Cited

U.S. PATENT DOCUMENTS

| | | | |
|---|---|---|---|
| 2003/0063884 A1* | 4/2003 | Smith | H01S 3/063 385/129 |
| 2005/0201429 A1* | 9/2005 | Rice | H01S 3/2383 372/27 |

(Continued)

OTHER PUBLICATIONS

PCT International Search Report and Written Opinion in International Appln. No. PCT/US2020/056787, dated Jan. 27, 2021, 17 pages.

*Primary Examiner* — Kinam Park
(74) *Attorney, Agent, or Firm* — Fish & Richardson P.C.

(57) ABSTRACT

Systems and methods include a radiation source configured to generate a first waveform, a first separator configured to separate the first waveform into linearly polarized second and third waveforms, a first modulator configured to modulate at least one of a phase and a polarization of the second waveform to generate a fourth waveform, a second modulator configured to modulate at least one of a phase and a polarization of the third waveform to generate a fifth waveform, a first combiner configured to combine the fourth and fifth waveforms to generate a sixth waveform, an amplifier configured to amplify the sixth waveform to generate a seventh waveform, a second separator configured to separate the seventh waveform into a plurality of amplified waveforms, and beam directing optics configured to direct the plurality of amplified waveforms to form an output waveform at a target location.

47 Claims, 8 Drawing Sheets

(51) Int. Cl.
*H01S 3/13* (2006.01)
*H01S 3/00* (2006.01)
*H01S 3/223* (2006.01)
*H01S 3/225* (2006.01)
*H01S 3/0943* (2006.01)
*H01S 3/094* (2006.01)
*G02F 1/01* (2006.01)
*G01N 21/59* (2006.01)
*G02B 27/28* (2006.01)

(52) U.S. Cl.
CPC ............ *H01S 3/1307* (2013.01); *G01N 21/59* (2013.01); *G01N 2201/06113* (2013.01); *G02B 27/283* (2013.01); *G02F 1/0136* (2013.01); *H01S 3/0943* (2013.01); *H01S 3/094003* (2013.01); *H01S 3/223* (2013.01); *H01S 3/225* (2013.01)

(56) References Cited

U.S. PATENT DOCUMENTS

| | | | | |
|---|---|---|---|---|
| 2006/0133431 A1* | 6/2006 | Payne | ............... | H01S 3/06754 372/6 |
| 2009/0219960 A1* | 9/2009 | Uberna | ............. | G02B 19/0057 372/27 |
| 2010/0079743 A1* | 4/2010 | Hidaka | ............. | G03F 7/70275 355/77 |
| 2010/0232007 A1* | 9/2010 | Byren | .................. | F41H 13/005 359/239 |
| 2015/0263477 A1* | 9/2015 | Onaka | ................. | G02F 1/1337 372/6 |
| 2016/0291137 A1* | 10/2016 | Sakimura | ............. | G01S 7/4815 |
| 2021/0063635 A1* | 3/2021 | Goodno | ............ | G02B 6/03694 |
| 2021/0103154 A1* | 4/2021 | Goodno | ............ | G02B 27/1086 |

* cited by examiner

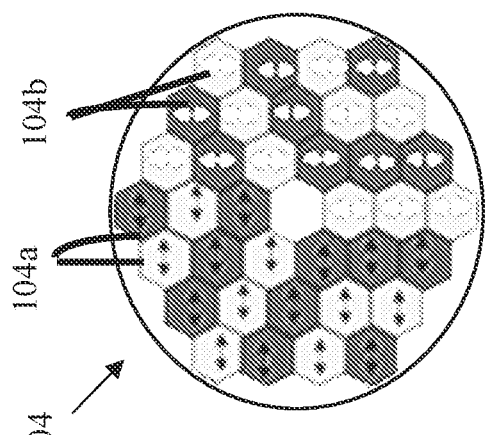
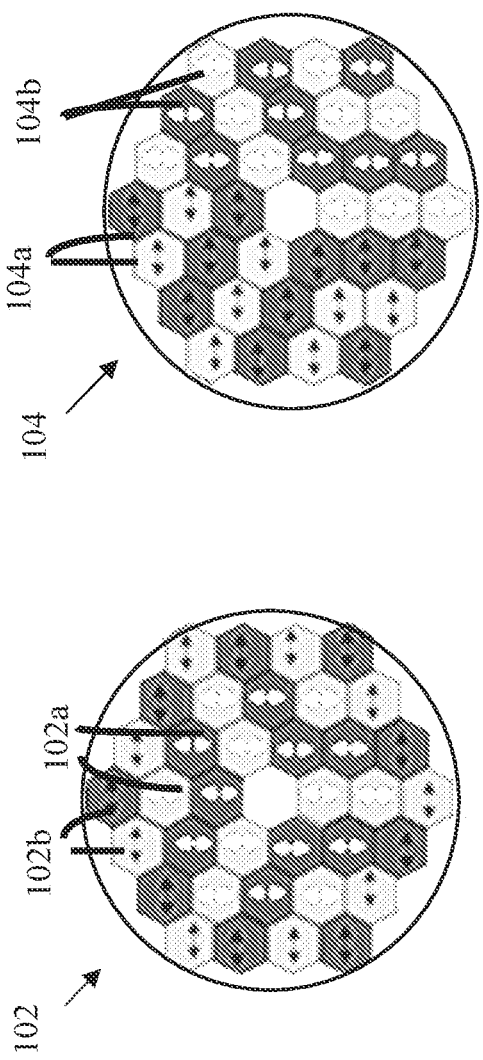
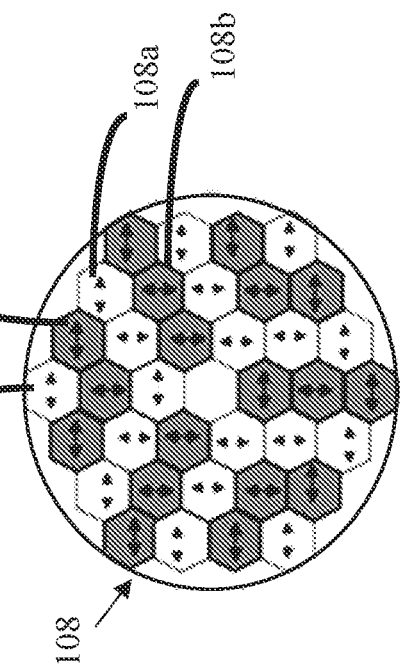
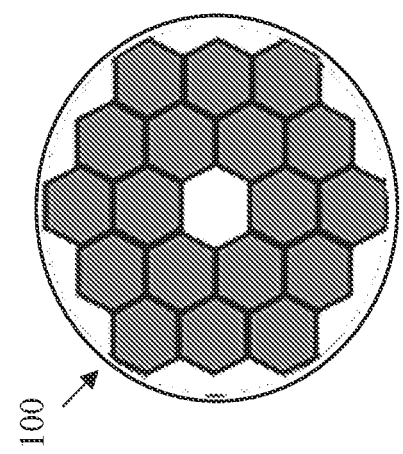
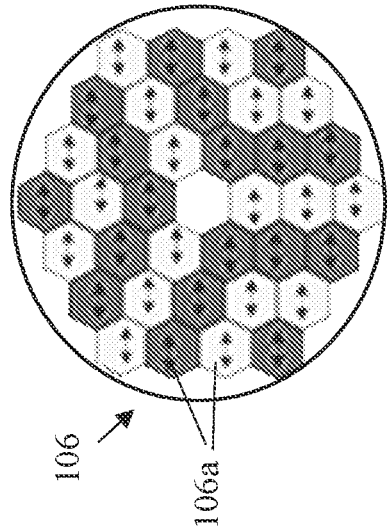
FIG. 10
FIG. 11
FIG. 12
FIG. 13
FIG. 14

MULTIPLEXING FIBER AMPLIFIED WAVEFORMS

CLAIM OF PRIORITY

This application claims priority under 35 USC § 119(e) to U.S. Provisional Patent Application Ser. No. 62/929,073, filed on Oct. 31, 2019, and entitled "MULTIPLEXING FIBER AMPLIFIED WAVEFORMS," the entire contents of which are hereby incorporated by reference.

BACKGROUND

This disclosure relates to methods and systems for combining amplified waveforms to generate high energy optical beams.

Commercially available high-power fiber amplifiers can be used to amplify seed beams to boost the optical power of the beams for a variety of applications such as material processing, long distance optical communication, power generation, and research and development activities. The maximum output that can be achieved for a particular output beam from a single fiber amplifier depends upon a number of factors including the gain properties of the fiber and the power density limit of the fiber.

SUMMARY

A number of applications may benefit from the generation of high-power optical waveforms that can be directed onto a target or location at a relatively long distance. Among such applications are directed energy weapons (DEWs) that deliver high energy output waveforms to selected targets. Physical and mechanical design constraints limit the optical power that can be extracted in a single output waveform from a single fiber amplifier to a few kilowatts in a narrow spectrum output waveform. DEWs, in particular, would benefit from output waveforms of higher power.

There are currently fundamental limitations on the power capability of fiber laser amplifiers. For broadband operation, the power-limiting phenomena are Stimulated Raman Scattering (SRS), thermal lensing, and pump power limits. Some researchers have suggested that a single fiber might be operated up to 36.6 kW of optical output power if the spectral bandwidth is sufficiently large. These broadband architectures are most useful for industrial processes such as cutting, welding, and additive manufacturing.

During narrow bandwidth operation the output power is typically limited by Stimulated Brillouin Scattering (SBS), thermal lensing, and pump power, and also by optical damage limits of the core materials and/or end facets of the fiber. True narrow line operation might be expected to be limited to about 1.86 kW by some estimates.

For individual fiber lasers, the use of alternate materials for the wave-guiding portion of the fiber (e.g., phosphate-based glasses rather than silica glass), different dopant materials (e.g., Er (Erbium) or Tm (Thulium) rather than Yb (Ytterbium)) as the gain medium, and/or doped crystal waveguides (e.g., Nd:YAG (Neodymium: Yttrium aluminum garnet) crystal rods) may allow increased output power to be obtained. However, such implementations can be costly and challenging to maintain during long-term operation.

One approach to generating higher power output waveforms involves combining waveforms into a single output waveform. Several techniques are available for performing such a combination.

Spatially overlapping multiple waveforms on a target or location can increase the total irradiance on the target or location additively. Incoherent combining of waveforms—in which the wavelength, optical phase, and beam pointing accuracy are not adaptively adjusted (except to ensure overlap at the target or location) may yield a combined irradiance as high as the average irradiance of the waveforms multiplied by the number of waveforms.

Another method for combining waveforms is Spectral Beam Combination (SBC). In SBC, waveforms of different wavelengths are expanded to a larger, common aperture dimension and then using a dispersive optical element such as a prism or diffraction grating, combined into a single waveform that propagates to a target or location. Careful selection of both the angular orientation and wavelength ensures that the waveforms are refracted or reflected from the dispersive optical elements onto a common optical axis. In some implementations, optical losses can be lower due to the relatively smaller diffractive spreading of the larger output pupil dimension in the system.

Certain methods for combining waveforms involve accounting for the coherence properties of the waveforms that are combined and are referred to as Coherent Beam Combination (CBC) methods.

In CBC methods, waveforms of a common wavelength, polarization, optical path length, and optical phase are combined. Constructive interference among the waveforms improves the optical irradiance in the far field according to the square of the number of waveforms. CBC can yield a smaller focused spot at the plane of the target or location. Different methods for CBC typically adjust the optical phases, path lengths, and polarizations of waveforms that are generated by a common master oscillator (MO). The waveforms can be amplified by separate fiber amplifiers to provide several kilowatts of output power in each waveform prior to combining the waveforms. The waveforms are then projected to a common spot in the far field to form a coherently combined output waveform.

When an optical waveform is propagated over long distances through the atmosphere, the optical power of the waveform can be reduced by a number of factors including absorption and scattering by gas molecules and/or aerosols, atmospheric turbulence, thermal blooming (due to localized heating of the air), mechanical vibrations of system components, fluctuations in the power and geometry of the waveforms, and physical limitations of hardware components that are used to actively compensate for the foregoing effects. In some embodiments, the influence of these various effects on the output waveform(s) can be measured or estimated, and adaptive optical elements can be used to pre-compensate for the effects by applying phase corrections (in the form of a conjugate phase map) to the waveform(s). As the waveform(s) propagate through the atmosphere, the foregoing effects are balanced by the pre-compensated phase. Under ideal conditions, when the waveform(s) arrive at a target or location, the phase front is relatively uniform, and irradiance is relatively high.

However, when waveforms amplified in individual fiber amplifiers are coherently combined to form an output waveform with a combined phase front that is nearly uniform, the combined irradiance can be given by the product of the squared number of waveforms and the irradiance from a single waveform. This output irradiance is achieved when the resolution of the compensating technique is sufficiently small to correct for turbulence in the atmosphere. The Fried Coherence Length, $r_0$, provides a measure of the scale of turbulence along the optical path of the output waveform. In practice, when the diameters of the waveforms that are combined are less than or equal to $r_0$ at the pupil plane, then phase conjugation can effectively compensate for atmospheric turbulence-based perturbation of the waveforms as they propagate.

This disclosure features methods and systems for amplifying input optical waveforms using one or more fiber amplifiers and combining the amplified waveforms to form an output waveform that is directed onto a target or location.

To overcome the limits of conventional fiber amplification, the input optical waveforms are generated such that they have differing polarization states and/or wavelengths. Waveforms with different polarization states and/or wavelengths can be co-amplified within a single fiber amplifier and the amplified output waveforms combined after emerging from the fiber amplifier, effectively increasing the output power of the combined beam relative to the output power that would otherwise be achievable by amplifying a single input beam in the fiber amplifier. Input beams with combinations of different polarization states and wavelengths can also be co-amplified in a single fiber amplifier, further increasing the output power of the combined beam.

By adjusting the polarization, wavelength, and other properties of the input beams prior to amplification, adaptive optical elements that are used for such processes—and which typically cannot tolerate high power densities—are not subject to potential thermal or refractive damage by exposing the elements to high power beams. Furthermore, beam directing optics can be used to combine the amplified beams into an output beam with selected intensity, phase, and polarization properties controlled across the output beam aperture. As such, properties of the output beam can be adapted to a wide variety of applications and environmental conditions.

According to an aspect a system includes a waveform generation apparatus configured to generate a plurality of input optical waveforms, with at least two of the input optical waveforms have different polarizations, an amplifier configured to amplify the input optical waveforms to generate an output waveform, and a beam forming apparatus configured to separate the output waveform into a plurality of amplified waveforms, and to direct the plurality of amplified waveforms to be incident on a target location.

Embodiments of the systems can include any one or more of the following features. Embodiments of the systems can also include any of the other features described herein, including any combinations of features described in connection with different embodiments, unless expressly stated otherwise.

The waveform generation apparatus includes a radiation source configured to generate a first waveform, and a first separator configured to separate the first waveform into linearly polarized second and third waveforms, wherein polarization directions of the second and third waveforms are orthogonal. The waveform generation apparatus includes a first modulator configured to modulate at least one of a phase and a polarization of the second waveform to generate a fourth waveform, and a second modulator configured to modulate at least one of a phase and a polarization of the third waveform to generate a fifth waveform. The waveform generation apparatus includes a first combiner configured to combine the fourth and fifth waveforms to generate a sixth waveform.

The amplifier is configured to amplify the sixth waveform to generate a seventh waveform. The beam forming apparatus includes a separator configured to separate the seventh waveform into a plurality of amplified waveforms, and beam directing optics configured to direct the plurality of amplified waveforms to form an output waveform at a target location. The first waveform includes radiation in a mixture of orthogonal, linearly polarized states. The first modulator includes a polarization modulator configured to adjust a polarization of the first waveform so that the first waveform comprises radiation in a mixture of orthogonal, linearly polarized states.

The amplifier is a fiber amplifier comprising an amplification fiber core doped with a gain medium. The system further includes a measurement apparatus configured to measure at least one property of the output waveform, and to transmit information about the measured at least one property to the waveform generation apparatus. The measurement apparatus is configured to measure a portion of the output waveform reflected from an object at the target location. The measurement apparatus is configured to measure a portion of the output waveform that does not reach the target location. The at least one property of the output waveform includes an amplitude of the output waveform. The at least one property of the output waveform includes at least one of a phase of the output waveform and a polarization of the output waveform.

The plurality of amplified waveforms includes at least one of six amplified waveforms, eighteen amplified waveforms, and thirty-six amplified waveforms. Each one of the plurality of amplified waveforms is linearly polarized in a common direction. A first subset of the plurality of amplified waveforms is linearly polarized in a first direction, and a second subset of the plurality of amplified waveforms is linearly polarized in a second direction that is orthogonal to the first direction. The wave forming apparatus is configured to receive the information about the measured at least one property of the output waveform and to control wave front orientations of each one of the plurality of amplified waveforms based on the information.

The first and second modulators are configured so that a phase offset exists between the fourth waveform and the fifth waveform. The first and second modulators are configured so that the fourth and fifth waveforms have a common phase. The waveform generation apparatus is configured to generate two input optical waveforms having different central wavelengths. The two input optical waveforms are phase locked. The amplifier is configured to amplify waveforms generated from each of the two input, phase locked optical waveforms. The plurality of amplified waveforms comprises n amplified waveforms, with the measurement apparatus configured to make at least n independent measurements of the output waveform. The at least n independent measurements comprise n spatially separated measurements of the at least one property of the output waveform. At least some of the at least n independent measurements correspond to different spatial locations associated with the output waveform. The different spatial locations correspond to different locations within a beam profile of the output waveform.

The amplifier comprises a crystalline host material doped with at least one rare earth element. The at least one rare earth element comprises at least one element selected from the group consisting of Nd, Yb, Er, Tm, and Ho.

The amplifier comprises a gain medium comprising at least one type of alkali vapor. The gain medium comprises at least one member selected from the group consisting of Rb vapor, K vapor, and Cs vapor. The amplifier comprises at least one of a chemical oxygen iodine laser, a hydrogen fluoride/deuterium fluoride laser, an excimer laser. A gain medium of the excimer laser comprises at least one member selected from the group consisting of XeCl, XeF, ArF, and KrF.

According to an additional aspect, a system includes a radiation source configured to generate a first waveform, a first separator configured to separate the first waveform into linearly polarized second and third waveforms, wherein polarization directions of the second and third waveforms are orthogonal, a first modulator configured to modulate at least one of a phase and a polarization of the second waveform to generate a fourth waveform, a second modulator configured to modulate at least one of a phase and a polarization of the third waveform to generate a fifth waveform, a first combiner configured to combine the fourth and fifth waveforms to generate a sixth waveform, an amplifier configured to amplify the sixth waveform to generate a seventh waveform, a second separator configured to separate the seventh waveform into a plurality of amplified waveforms, and beam directing optics configured to direct the plurality of amplified waveforms to form an output waveform at a target location.

Embodiments of the systems can include any one or more of the following features. Embodiments of the systems can also include any of the other features described herein, including any combinations of features described in connection with different embodiments, unless expressly stated otherwise.

The radiation source comprises a laser source.

According to an additional aspect, a method includes generating from a radiation source a plurality of input optical waveforms, with at least two of the plurality of input optical waveforms having different polarizations, amplifying the plurality of input optical waveforms to generate an output waveform, and separating the output waveform into a plurality of amplified waveforms that are directed to be incident on a target location.

Embodiments of the methods can include any one or more of the following features. Embodiments of the methods can also include any of the other features described herein, including any combinations of features described in connection with different embodiments, unless expressly stated otherwise.

The method further includes separating the first waveform into linearly polarized second and third waveforms that are orthogonal. The method further includes combining the fourth and fifth waveforms to form a sixth waveform. The method further includes amplifying the sixth waveform to generate a seventh waveform, separating the seventh waveform into a plurality of amplified waveforms.

The method further includes directing the plurality of amplified waveforms to form an output waveform at a target location. The method further includes measuring at least one property of the output waveform, and modulating the second and third waveforms based on the measured at least one property. Measuring measures a portion of the output waveform reflected from an object at a target location. Measuring measures a portion of the output waveform that does not reach a target location.

The at least one property of the output waveform comprises an amplitude of the output waveform. The at least one property of the output waveform comprises a phase of the output waveform.

The details of one or more embodiments are set forth in the accompanying drawings and the description below.

Other features and advantages will be apparent from the description, drawings, and claims.

DESCRIPTION OF DRAWINGS

FIGS. 10-14 are schematic diagrams showing output waveforms with different wavelength and polarization states.

DETAILED DESCRIPTION

Introduction

Figure 1:
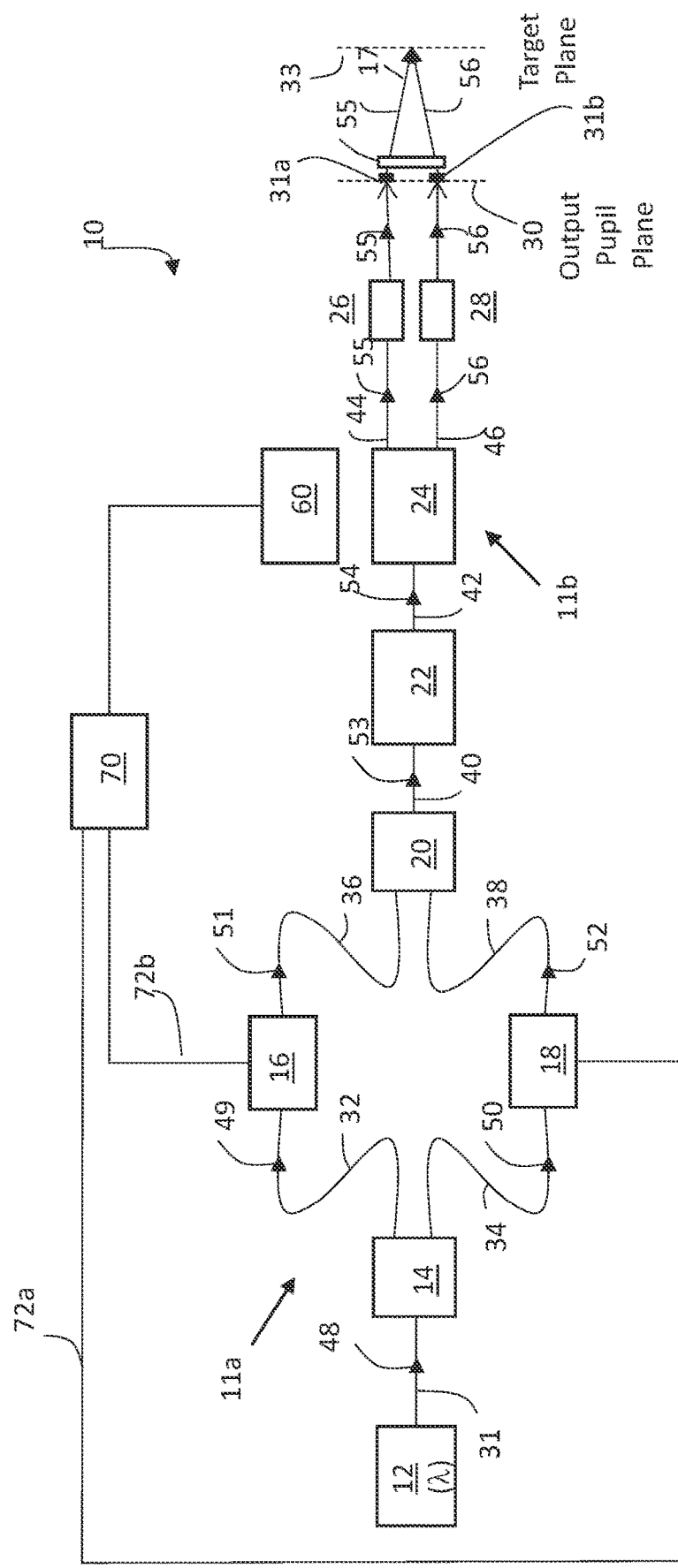
FIG. 1 is a schematic diagram showing an example system that generates high-power output waveforms.

An important factor for DEWs that are mounted on vehicles and are used in mobile applications is maintaining the size and weight within manageable limits. High energy sources that are too heavy and/or occupy large spatial volumes are impractical for mobile use. To integrate high energy sources with a mobile transportation platform, size and weight reduction are significant considerations. Because of their relative size and weight (which includes pump diode modules and the power and thermal management systems that operate the fiber amplifiers), fiber amplifiers contribute significantly to the overall size and weight of high energy sources. Reducing the number of fiber amplifiers that are present in a high energy source is one path toward achieving suitable size and weight design specifications.

When the number of fiber amplifiers is reduced, the number of waveforms that are combined to form an output waveform is also reduced, since each waveform that is combined to form the output waveform is first amplified in its own corresponding fiber amplifier. To compensate for the overall reduction in the number of fiber amplifiers, the output power of each amplified waveform can be increased. However, this approach also reduces the number of waveforms that are combined at the target or location, with each waveform having a larger diameter at the output pupil plane. As a result, adaptive compensation for atmospheric turbulence and other atmospheric perturbations, as discussed above, can be less effective.

Thus, multiplexing waveforms amplified in fiber amplifiers to generate a high-power output waveform involves balancing contradictory design considerations. On one hand, certain advantages are associated with having a larger number of fiber amplifiers, namely, the number of amplified waveforms that are generated is larger. Because the number of waveforms is larger, to achieve a given output power in the combined waveform at a target or location, the power of each amplified waveform can be smaller, and therefore the transverse dimension of each waveform at the output pupil plane can be smaller. By combining amplified waveforms of smaller transverse dimensions to generate the output high power waveform, improved compensation for atmospheric turbulence and other perturbations can be achieved.

On the other hand, disadvantages to having a larger number of fiber amplifiers include significantly greater cost, size, and weight. Reducing the number of fiber amplifiers addresses these factors, but also yields fewer amplified waveforms—each with higher output power—than in systems with larger numbers of fiber amplifiers. Because each waveform has higher power, the transverse dimension of each waveform is larger to avoid photorefractive and thermal damage to the fiber amplifiers and other optical components of the system. With larger transverse dimensions of the amplified waveforms at the output pupil plane, it is more difficult to compensate for atmospheric turbulence and other perturbations that occur during waveform propagation toward a target or location.

The methods and systems described herein generate an output waveform at a target or location by combining a relatively large number of amplified waveforms, which allows for compensation of atmospheric turbulence and perturbations using a variety of phase conjugate techniques. At the same time, the methods and systems use smaller numbers of fiber amplifiers than conventional high energy sources, reducing the overall size and weight of the systems. For example, the systems disclosed herein can typically generate N number of amplified waveforms using fewer than N number of fiber amplifiers. These N amplified waveforms are then combined to generate an output waveform at the target or location.

Various multiplexing methods are used to amplify more than one waveform in some or all of the fiber amplifiers used in the systems described below. The multiple amplified waveforms generated in a given fiber amplifier can be separated (e.g., on the basis of polarization and/or wavelength) after emerging from the amplifier and projected onto the target or location.

Compensation for atmospheric turbulence and perturbations can involve adjustment of various properties of a waveform, including phase, amplitude, spectral properties, and polarization. Adaptive optical components, which provide adjustable modulation to a waveform, are generally used for this purpose. Such components can include, for example, deformable mirrors, liquid crystal-based modulators, acousto-optic modulators, and other components that can be selectively configured to apply a variable modulation to a waveform. Such elements are typically expensive, should be maintained relatively clean to be effective, and are subject to refractive and thermal damage at high optical powers.

Accordingly, by reducing the number of adaptive optical components that are used, the system cost can be lowered, system reliability can be improved, and the system size and weight can be reduced. Furthermore, in the systems described herein, adaptive optical components are used to adjust relatively low power optical waveforms prior to amplification in fiber amplifiers. By eliminating adaptive optical components from operating on high power waveforms, maintenance costs and requirements are reduced. In particular, photorefractive and/or thermal damage to the adaptive optical components is less likely to occur, reducing or eliminating the time and expense associated with replacing these components.

High Power Sources with Multiplexed Amplified Waveforms

To generate a multiplexed output waveform by combining a relatively large number of amplified waveforms on a target or location, while at the same time reducing the number of fiber amplifiers in a high-power source (such that for N amplified waveforms, fewer than N fiber amplifiers are present), input waveforms undergo multiplexed amplification in the source's fiber amplifiers. A variety of different multiplexed amplification methods can be implemented.

Referring now to FIG. 1 an example of a system 10 that functions as a source of high-power output waveforms is shown. System 10 includes a waveform generation apparatus 11a that includes a radiation source 12, a first separator 14, a first modulator 16, a second modulator 18, and a first combiner 20. System 10 also includes a fiber amplifier 22 and a beam forming apparatus 11b having a second separator 24, first beam directing optics 26, and second beam directing optics 28. The various components of system 10 are optically coupled by fibers 31, 32, 34, 36, 38, 40, 42, 44, and 46 that carry respective waveforms.

Radiation source 12 generally functions as a master oscillator, generating a first waveform 48 with a wavelength of λ. Waveform 48 is received by first separator 14, which separates first waveform 48 into second and third waveforms 49 and 50. The second waveform 49 is coupled into fiber 32 and transported to first modulator 16, while the third waveform 50 is coupled into fiber 34 and transported to second modulator 18. First and second modulators 16 and 18 modulate one or more properties of the second and third waveforms 49 and 50, generating fourth and fifth waveforms 51 and 52, respectively. The fourth waveform 51 is coupled into fiber 36 and transported to first combiner 20, while the fifth waveform 52 is coupled into fiber 38 and also transported to first combiner 20.

First combiner 20 receives the fourth and fifth waveforms 51 and 52 and combines them to generate a sixth waveform 53 that is coupled into fiber 40. The sixth waveform 53 is transported by fiber 40 to fiber amplifier 22. Within amplifier 22, the sixth waveform 53 undergoes amplification, generating a seventh waveform 54 that is coupled into fiber 42. The seventh waveform 54 is transported by fiber 42 to second separator 24, which separates the seventh waveform 54 into multiple amplified waveforms. As shown in FIG. 1, a first one of the amplified waveforms 55 is coupled into fiber 44 and transported to first beam directing optics 26, while a second one of the amplified waveforms 56 is coupled into fiber 46 and transported to second beam directing optics 28.

First beam directing optics 26 optionally modulates one or more properties of the first amplified waveform 55 (including, but not limited to, the waveform's phase, amplitude, spectrum, and/or polarization) and direct the first amplified waveform 55 to be incident at a first position 31a at a generalized location 30 (which can, for example, correspond to an output pupil plane). Second beam directing optics 28 optically modulate one or more properties of the second amplified waveform 56 (including, but not limited to, the waveform's phase, amplitude, spectrum, and/or polarization) and direct the second amplified waveform 56 to be incident at a second position 31b at generalized location 30.

Radiation source 12 can generally be implemented in a variety of ways. In some embodiments, for example, radiation source 12 can be a diode-pumped, solid state laser source. In certain embodiments, radiation source 12 can be a semiconductor laser, or can include an array of semiconductor lasers. In certain embodiments, radiation source 12 can be a flashlamp-pumped, solid state laser source. In some embodiments, radiation source 12 can be a fiber laser source (e.g., a fiber laser oscillator, a fiber-amplified laser source).

Other sources that can be used include, but are not limited to, lasers with dye-based (i.e., solution) gain media, gas lasers, and chemical lasers.

Waveform 48 can be a continuous-wave (CW) waveform corresponding to a particular spectral wavelength and frequency, or a pulsed waveform with a spectral bandwidth having a central wavelength. It should be understood that in the following discussion, the "wavelength" of a waveform refers to the CW wavelength (if the waveform is a CW waveform), and the central wavelength of the waveform's spectral bandwidth (if the waveform is a pulsed waveform). The wavelength of waveform 48 can generally be in any region of the electromagnetic spectrum, including the UV region, the visible region, the infrared region, and the microwave region.

Any of the waveforms described herein, including waveform 48, can be a pulsed waveform having a spectral bandwidth (the full width at half maximum of the distribution of wavelength components in the pulsed waveform) of 0.5 nm or more (e.g., 1.0 nm or more, 2.0 nm or more, 3.0 nm or more, 5.0 nm or more, 10.0 nm or more, 15.0 nm or more, 20.0 nm or more, or even more). Moreover, the spectral bandwidth of any of the waveforms described herein can be 1 kHz or more (e.g., 100 kHz or more, 500 kHz or more, 1 MHz or more, 10 MHz or more, 50 MHz or more, 100 MHz or more, 200 MHz or more, 300 MHz, 500 MHz or more, 700 MHz or more, 1 GHz or more, 50 GHz or more, 100 GHz or more, 200 GHz or more, 500 GHz or more, 600 GHz or more, 700 GHz or more, 800 GHz or more).

Waveform 48 can generally have a variety of different polarization states. For example, in some embodiments, waveform 48 is linearly polarized. In certain embodiments, waveform 48 corresponds to radiation in a mixture of linearly polarized, orthogonal polarization states. Further, in some embodiments, waveform 48 includes circularly polarized radiation and/or elliptically polarized radiation.

In FIG. 1, waveform 48 propagates from radiation source 12 to first separator 14 through optical fiber 31. Fiber-based coupling and transport of waveforms in system 10 can be advantageous in several respects. For example, by transporting waveform 48 within fiber 31, losses due to atmospheric turbulence and perturbations—which may occur during free-space propagation of waveform 48—are eliminated. Further, operational safety of system 10 may be increased, as unconfined optical waveforms do not propagate freely in the vicinity of system components. Further still, system 10 may be less prone to the effects of mechanical vibrations; by coupling waveform 48 directly from an output aperture of radiation source 12 to an input aperture of first separator 14, relative displacement between these components due to vibrations is mitigated.

However, it should be understood that in various embodiments of system 10, some or all of the optical fibers shown in FIG. 1 (and in subsequent figures) can be eliminated, and the various waveforms generated can be allowed to propagate through free space between system components.

An important aspect of the systems and methods disclosed herein is the co-amplification of multiple waveforms within a single fiber amplifier. In FIG. 1, the system 10 for amplification includes the single amplifier 22. However, in other implementations the system 10 for amplification consists essentially of the amplifier 22.

In FIG. 1, sixth waveform 53, which includes or in some implementations consists essentially of the combination of fourth waveform 51 and fifth waveform 52, is amplified by fiber amplifier 22. In other words, fourth waveform 51 and fifth waveform 52, which have different properties and propagate independently within fiber 40, even though they are represented collectively as sixth waveform 53, are each independently amplified within fiber amplifier 22.

To generate multiple waveforms for co-amplification within fiber amplifier 22, first waveform 48 is split into multiple waveforms by first separator 14. In FIG. 1, two waveforms are produced—second waveform 49 and third waveform 50. More generally, however, first separator 14 can generate any number of waveforms by splitting first waveform 48, including two or more waveforms, three or more waveforms, four or more waveforms, five or more waveforms, six or more waveforms, eight or more waveforms, ten or more waveforms, twelve or more waveforms, fifteen or more waveforms, twenty or more waveforms, or even more waveforms.

In some embodiments, splitting of first waveform 48 by first separator 14 yields waveforms with different properties. In FIG. 1, first separator 14 can generate second waveform 49 that is linearly polarized in a first direction, and third waveform 50 that is linearly polarized in a second direction orthogonal to the first direction. In these embodiments, first separator 14 can include various types of polarization-selective optical elements such as polarizing beam splitters, mirrors with polarization-selective optical coatings, optical wave plates, and polarization-sensitive dispersive elements such as gratings and prisms. In general, the components of first separator 14 function to spatially separate orthogonally polarized components of first waveform 48, and the separated components are directed into fibers 32 and 34 as second waveform 49 and third waveform 50, respectively.

In certain embodiments, first separator 14 can generate second waveform 49 and third waveform 50 such that the waveforms have different wavelengths. For example, first separator 14 can include various types of wavelength-selectively optical elements such as wavelength-dependent beam splitters, mirrors with wavelength-selective optical coatings, and dispersive elements such as gratings and prisms. The components of first separator 14 function to spatially separate different spectral components of first waveform 48; these spectral components are directed into fibers 32 and 34 as second waveform 49 and third waveform 50, respectively.

It should be noted that when first separator 14 generates more than two waveforms by splitting first waveform 48, more than two optical fibers are used to couple the generated waveforms to modulators. Thus, for example, if first separator 14 generates three waveforms, then system 10 includes three fibers to couple the waveforms to three different modulators, and three additional fibers to couple the modulated waveforms to first combiner 20. Similarly, three fibers are used to couple the corresponding amplified waveforms from second separator 24 to three different sets of beam directing optics.

In some embodiments, first separator 14 generates second waveform 49 and third waveform 50 such that these waveforms have similar polarization and spectral properties. For example, first separator 14 can effectively function as a beam splitter, dividing first waveform 48 into two (or more, as discussed above) waveforms. First separator 14 can include one or more beam splitters, partially-reflective mirrors, and/or similar beam-splitting optical elements.

For purposes of clarity, the subsequent discussion will assume that first separator 14 generates two waveforms from first waveform 48, i.e., second waveform 49 and third waveform 50, as shown in FIG. 1. However, it should be appreciated that the methods and system components described below can be adapted to the generation of more than two waveforms from first waveform 48, and such embodiments are within the scope of this disclosure.

Second waveform 49 is transported to first modulator 16 and third waveform 50 is transported to second modulator 18. The first and second modulators 16, 18 generally function to adjust one or more properties of second waveform 49 and third waveform 50 to generate fourth and fifth waveforms 51 and 52, respectively. In general, the first and second modulators 16, 18 can be implemented to adjust one or more of the polarization, phase, amplitude, and/or spectral distribution of second and third waveforms 49 and 50.

As shown in FIG. 1, first and second modulators 16 and 18 are connected to a controller 70 that is also connected to a measurement apparatus, such as a detection sub-system 60. Detection sub-system 60 measures radiation reflected from a particular location, such as a target, or an output pupil plane. For example, detection sub-system 60 can measure radiation reflected from location 30. Electrical signals representing reflected radiation are transmitted to controller 70, which in turn transmits suitable control signals to first and second modulators 16 and 18.

During operation of system 10, controller 70 can analyze the electrical signals transmitted by detection sub-system 60 to determine information, via connections such as lines 72a 72b, about optical properties of the amplified waveforms, including information about amplitude variations in the waveforms, phase variations in the waveforms, and polarization variations in the waveforms. As discussed previously, such variations can be due to a number of factors, including atmospheric turbulence, absorption and scattering events, local heating of the air or optical components, interactions with airborne aerosols, and systemic and non-systemic hardware perturbations.

To compensate for these variations, the control signals transmitted by controller 70 direct first and second modulators 16 and 18 to adjust the properties of second and third waveforms 49 and 50. In effect, fourth and fifth waveforms 51 and 52—which are adjusted—are pre-corrected for the various effects described above, so that when the amplified waveforms propagate through free space to location 30, they combine at location 30 to generate a desired irradiance profile. In some embodiments, for example, the desired irradiance profile corresponds to a waveform amplitude and phase profile that is approximately uniform at location 30. More generally, however, first and second modulators 16 and 18 can be adjusted by controller 70 to produce any desired amplitude and phase profile at location 30.

In some embodiments, as discussed above, location 30 corresponds to a target plane, i.e., the location of a target onto which each of the waveforms is incident. In certain embodiments, location 30, as shown in FIG. 1, corresponds to an output pupil plane of the system, and the system includes output optics 17 that direct first and second amplified waveforms 55 and 56 onto a target plane 33 where a target may be nominally positioned. Output optics 17 can generally include one or more of a variety of different optical components for relaying optical beams from one location (i.e., location 30) to another (i.e., target plane 33). Examples of such output optics 17 elements include, but are not limited to, lenses (e.g., lens systems with one, two, three, four, five, or more than give lenses that are configured to relay and/or focus waveforms 55 and 56 from location 30 to target plane 33), mirrors (including curved mirrors that function as lenses), phase masks, liquid crystal modulators, fluidic modulators, and other elements with optical power.

In general, free space propagation of waveforms 55 and 56 between location 30 and target plane 33 introduces optical aberrations into each waveform, the aberrations arising from atmospheric turbulence and interactions (e.g., nonlinear interactions) between the waveforms and atmospheric constituents. The cumulative effect of these aberrations can be to reduce the total irradiance at a location on target plane 33 where waveforms 55 and 56 are incident (e.g., focused by output optics 17).

To compensate for such aberrations, the amplitude and/or phase profiles of waveforms 55 and 56 can be adjusted such that at location 30, they correspond to (or include contributions corresponding to) a conjugate of the aberrations introduced by propagation between location 30 and target plane 33. Specifically, signals can be measured by detection sub-system 60 (e.g., light reflected from a target located at target plane 23) that contain information about the aberrations which arise, and detection subsystem 60 can transmit information about the aberrations to controller 70, which in turn generates control signals that are transmitted to modulators 16 and/or 18 to adjust the properties of each of the waveforms.

The properties of each of the waveforms—including the amplitude, phase, wave front tilt, k-vector orientation, polarization, and path length—can be adjusted by modulators 16 and/or 18 to introduce a conjugate of the aberrations introduced by propagation between location 30 and target plane 33, such that waveforms 55 and 56 form a combined, in-phase field at target plane 33.

As will be discussed in greater detail below, modulators 16 and/or 18 can be implemented in a variety of ways to provide suitable adjustment of the waveforms to compensate for downstream optical aberrations. In general, each of these implementations involves generating control signals for the modulators such that a conjugate of the aberrations introduced into the waveforms during propagation between location 30 and target plane 33 (or more generally, between any locations along the optical paths traveled by the waveforms) is introduced by the modulators, in effect "pre-compensating" the waveforms for the downstream aberrations.

In some embodiments, pre-compensation of the waveforms by introducing perturbations that are conjugate to downstream optical aberrations is used to achieve an ideal or near-ideal, uniform phase and/or amplitude profile at target plane 33 across the waist of the spot formed by the combined waveforms. In certain embodiments, however, a non-uniform amplitude and/or phase profile at target plane 33 can be desired, and generated by appropriate configuration of modulators 16 and/or 18 by controller 70.

For example, certain manufacturing processes such as cutting thick sections of material may be enhanced if the beam profile is shaped to promote better initiation of the cutting seam and then continue to cut deeper as the output spot is scanned across the part. As another example, additive manufacturing may be enhanced by tailored spot profiles that control the melt and consolidation (sintering) of materials from which parts are formed in a three-dimensional printing process. Controller 70 selectively provides suitable control signals to modulators 16 and/or 18 to configure the modulators to generate waveforms (e.g., waveforms 55 and/or 56) with appropriate phase, amplitude, polarization, and orientation profiles such that when the waveforms are combined at target plane 33, an output (e.g., combined) waveform or spot having the desired properties is generated.

First and second modulators 16 and 18 can be implemented in a variety of ways, depending upon the nature of the adjustments that are performed to second and third waveforms 49 and 50. In some embodiments, for example, the modulators can include one or more deformable mirrors that are used to adjust the phase of a waveform.

Figure 2:
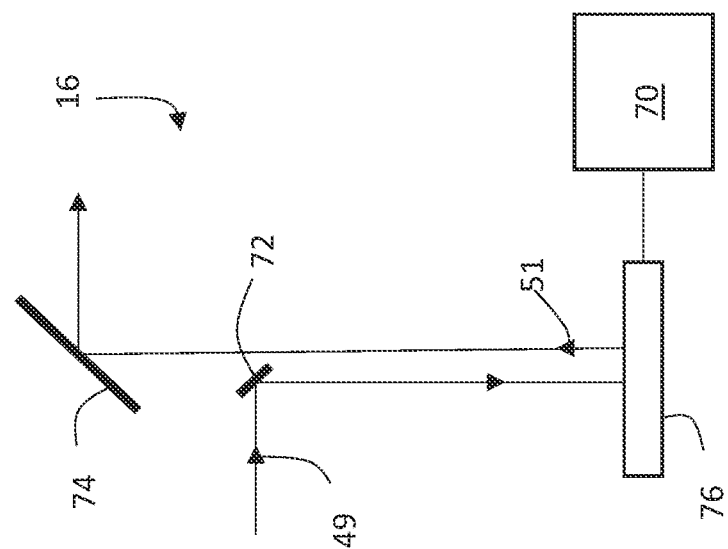

Referring now to FIG. 2, an example of first modulator 16 that includes a deformable mirror 76 connected to controller 70 is shown. During operation, second waveform 49 is reflected by mirror 72 and is incident on deformable mirror 76. Controller 70 adjusts the surface profile of deformable mirror 76 to control both the phase profile across the transverse dimension of second waveform 49 (to adjust the tilt of the optical phase front of second waveform 49), and an overall phase offset applied to second waveform 49. The resulting phase modulated fourth waveform 51 is reflected by mirror 74 and emerges from first modulator 16.

In some embodiments, first and second modulators 16 and 18 can include one or more optical elements for adjusting the polarization of second and third waveforms 49 and 51. Moreover, in some embodiments, first and/or second modulators 16 and 18 can be polarization modulators that adjust a polarization of first waveform 48 such that first waveform includes radiation in a mixture of orthogonal, linearly polarized states as described below.

Figure 3:
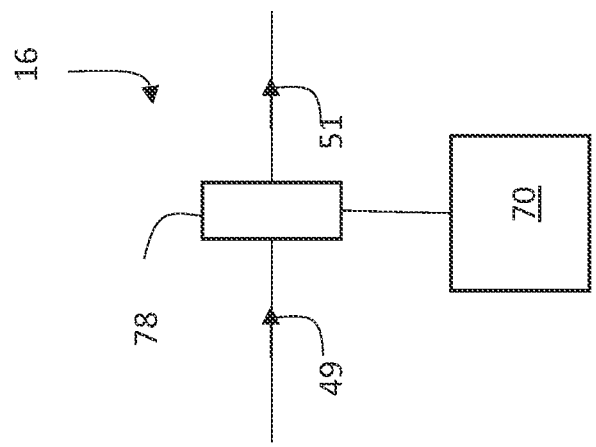
FIGS. 2 to 4 are schematic diagrams showing examples of waveform modulators.

Referring now to FIG. 3 an example of first modulator 16 that includes an adjustable half wave plate 78 connected to controller 70 is shown. During operation, second waveform 49 is incident on half wave plate 78. Controller 70 adjusts the angular orientation of half wave plate 78 to adjust the polarization of fourth waveform 51 that emerges from first modulator 16.

Alternatively, or in addition, in some embodiments the polarization orientation may be controlled using a Faraday rotator embedded in modulators 16 and/or 18. By manipulation of the magnetic field surrounding a suitable crystalline material, the polarization vector can be rotated by an amount in proportion to the magnitude of the magnetic field.

In certain embodiments, first and second modulators 16 and 18 can include optical elements for adjusting the spectral components of second and third waveforms 49 and 50.

Figure 4:
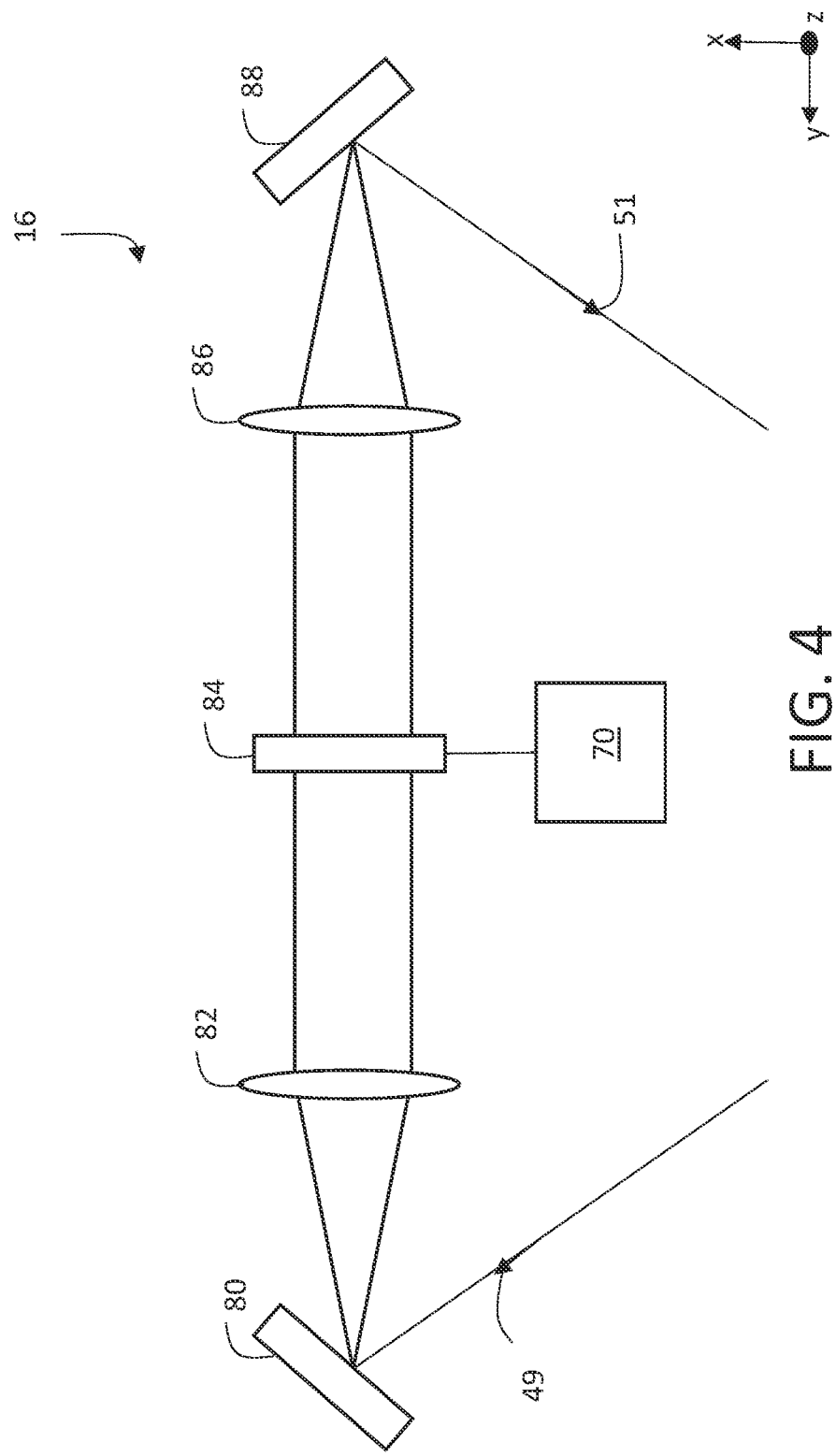

Referring now to FIG. 4 an example of first modulator 16 that includes a spatial light modulator (SLM) 84 connected to controller 70 is shown. Within the optical arrangement shown in FIG. 4, SLM 84 can directly adjust individual spectral components of second waveform 49. During operation, second waveform 49 is incident on grating 80, which disperses the spectral components of second waveform 49 spatially in the x-coordinate direction as shown in FIG. 4. The divergent spectral components are collimated by lens 82 and are then incident on SLM 84. SLM 84 includes an array of liquid crystal pixels or cells, in which the orientation of the liquid crystal domains in each cell is controlled by controller 70. By adjusting electrical signals applied to each pixel of SLM 84, controller 70 adjusts the modulator of each spectral component of second waveform 49. The modulated spectral components are then refocused by lens 86 onto grating 88, which recombines the components to form fourth waveform 51.

Depending upon the construction of SLM 84, the SLM can be used to impart a variety of different modulations to second waveform 49. In some embodiments, for example, SLM 84 imparts adjustable polarization modulation to second waveform 49. In certain embodiments, SLM 84 includes one or more polarizing elements, and imparts selective amplitude modulation to the spectral components of second waveform 49. In some embodiments, SLM 84 includes one or more wave plates, and imparts selective phase modulation to the spectral components of second waveform 49.

SLM 84 can also be configured to impart multiple different types of modulations to second waveform 49. For example, in certain embodiments, SLM 84 can be implemented as a two-dimensional liquid crystal-based modulator, and can impart selective polarization and phase modulation, selective phase and amplitude modulation, or selective polarization and amplitude modulation to second waveform 49.

The embodiments of first modulator 16 shown in FIGS. 2-4 are examples, and it should be understood that a wide variety of different implementations can be used.

In some embodiments, for example, first modulator 16 can be implemented fully, or in part, as a phase modulator with a non-linear crystal such as lithium niobate (LiNbO3) as a phase modulation element. The phase of a waveform propagating through the crystal can be manipulated by introducing an optical delay in the waveform in proportion to a voltage applied across the crystal (i.e., the crystal functions as an electro-optic modulator). The optical delay introduced is equivalent to a phase modulation of the waveform.

In certain embodiments, first modulator 16 can be implemented fully, or in part, as a fiber stretcher. In a fiber stretcher, the waveform passes through a length of optical fiber, and the length of the fiber is adjusted (via fiber stretching) to impart an optical delay, which is equivalent to introducing a phase modulation to the waveform.

In some embodiments, first modulator 16 can be implemented fully, or in part, as a re-orientable fiber. For example, first modulator 16 can include a fiber through which a waveform propagates. Coupled to the output end of the fiber is an electro-mechanical actuator that receives a control signal from controller 70, and moves the output end of the fiber in a lateral direction (i.e., a direction orthogonal to the fiber axis). Repositioning the output end of the fiber in this manner changes the pointing angle of the fiber axis, and adjusts the wave front tilt of the waveform exiting from the fiber. The re-orientable fiber can be positioned in front of one or more lenses that are used to control divergence and collimation of the waveform after it emerges from the fiber. Further, re-orientable fibers can, in some embodiments, be positioned adjacent to (or at) location 30, particularly when location 30 corresponds to an output pupil plane.

Implementations of first modulator 16 can also include combinations of the optical elements shown in FIGS. 2-4 and in the other examples discussed above, as well as combinations of other optical elements, for the purpose of modulating second waveform 49. Second modulator 18 can generally be implemented in any of the same ways as first modulator 16. Moreover, within system 10, first and second modulators 16 and 18 can be implemented in the same manner or differently, depending upon the nature of second and third waveforms 49 and 51 and the desired modulation thereof.

After emerging from first and second modulators 16 and 18 respectively, fourth and fifth waveforms 51 and 52 are combined into sixth waveform 53 by first combiner 20. First combiner 20 can be implemented in various ways. In some embodiments, for example, first combiner 20 can include a partially reflective mirror that generates a combined sixth waveform 53.

Figure 5:
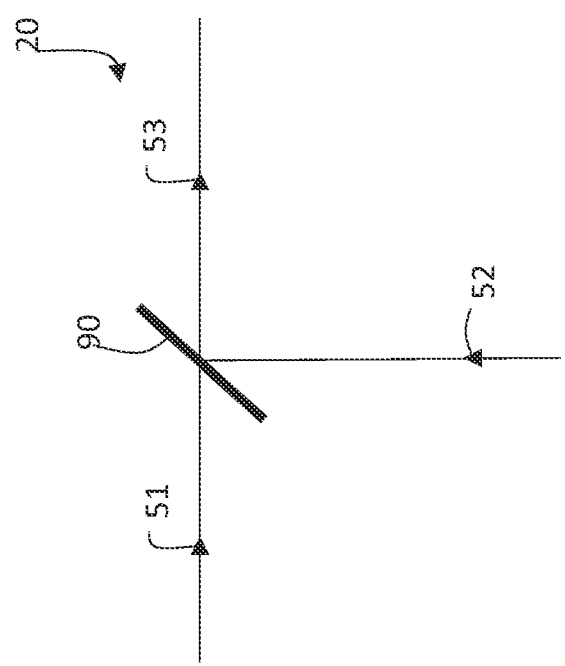

Referring now to FIG. 5, an example of first combiner 20 that includes a partially reflective mirror 90 is shown. During operation, fourth waveform 51(or a portion thereof) passes through mirror 90, while fifth waveform 52 (or a portion thereof) reflects from mirror 90. The respective transmitted and reflected portions of the fourth and fifth waveforms form sixth waveform 53, which emerges from first combiner 20. In certain embodiments, where fourth and fifth waveforms 51 and 52 are linearly and orthogonally polarized, mirror 90 can be implemented as a polarizing beam splitter. In this configuration, mirror 90 can be oriented so that fourth waveform 51 is nearly entirely transmitted through the beam splitter, and fifth waveform 52 is nearly entirely reflected by the beam splitter.

In some embodiments, where fourth and fifth waveforms 51 and 52 have different wavelengths, mirror 90 can be implemented as a wavelength-dependent beam splitter. In such a configuration, an optical coating on mirror 90 is selected such that mirror 90 is substantially transmissive at the wavelength of fourth waveform 51, and substantially reflective at the wavelength of fifth waveform 52. As above, the respective transmitted and reflected portions of the fourth and fifth waveforms form sixth waveform 53, which emerges from first combiner 20.

Alternatively, or in addition, where fourth and fifth waveforms 51 and 52 have different wavelengths, they can be combined using a dispersive optical element such as a grating or prism. By directing the waveforms to be incident on the dispersive optical element at suitable (and different) angles, the waveforms emerge from or are reflected from the dispersive optical element along parallel optical paths, which may be coincident (e.g., forming sixth waveform 53).

In certain embodiments, where fourth and fifth waveforms 51 and 52 do not differ significantly in wavelength or polarization (but, for example, are temporally offset and/or have different phase properties), a neutral density, partially reflective optical coating can be used on mirror 90 such that portions of both fourth and fifth waveforms 51 and 52 are transmitted by, and reflected by, mirror 90. The transmitted portion of fourth waveform 41 and the reflected portion of fifth waveform 52 form sixth waveform 53.

First combiner 20 can also be implemented as fiber-based combiner.

Figure 6:
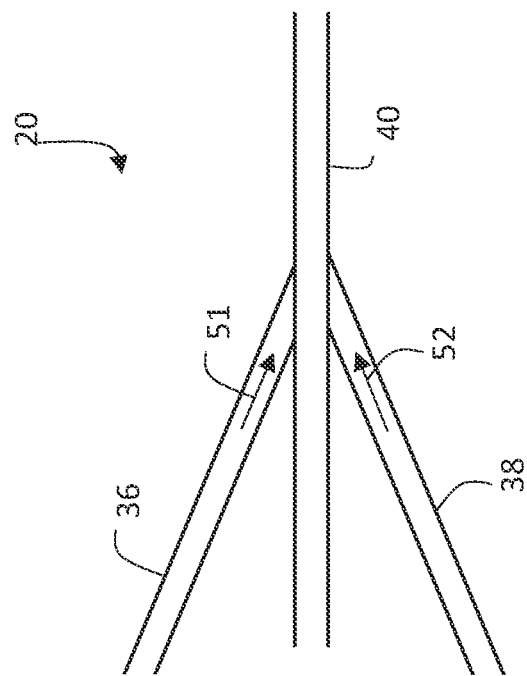
FIGS. 5 to 6 are schematic diagrams showing examples of waveform combiners.

FIG. 6 shows a schematic diagram of an example of an all-fiber first combiner 20. In FIG. 6, fiber 36 (carrying fourth waveform 51) and fiber 38 (carrying fifth waveform 52) are laterally spliced to fiber 40 at a relatively shallow angle. By selecting a combination of fiber core and cladding materials (to generate a suitable index of refraction contrast) and choosing an appropriate angle for the lateral splices, fourth and fifth waveforms 51 and 52 can be directly coupled into fiber 40, through which they propagate to fiber amplifier 22.

As discussed above, an important feature of the systems and methods described herein is the co-amplification of multiple waveforms within a single fiber amplifier.

Referring back to FIG. 1, both fourth waveform 51 and fifth waveform 52 are co-amplified in fiber amplifier 22 (although they are referred to collectively as sixth waveform 53 for convenience). Following fiber amplifier 22, the co-amplified waveforms are separated from one another and individually directed to location 30. As such, for purposes of later separation (and individual adjustment by controller 70), the waveforms typically differ in one or more optical properties.

In some embodiments, fourth and fifth waveforms 51 and 52 have orthogonal linear polarizations. The waveforms can be simultaneously co-amplified within fiber amplifier 22. Depending upon the particular implementation of fiber amplifier 22, the gain profiles for the two polarizations may differ, and some amount of depolarization is possible. Nonetheless, the fourth and fifth waveforms (collectively undergoing amplification as sixth waveform 53) can be co-amplified to form seventh waveform 54, which is coupled into fiber 42.

In certain embodiments, fourth and fifth waveforms 51 and 52 have different wavelengths.

Figure 7:
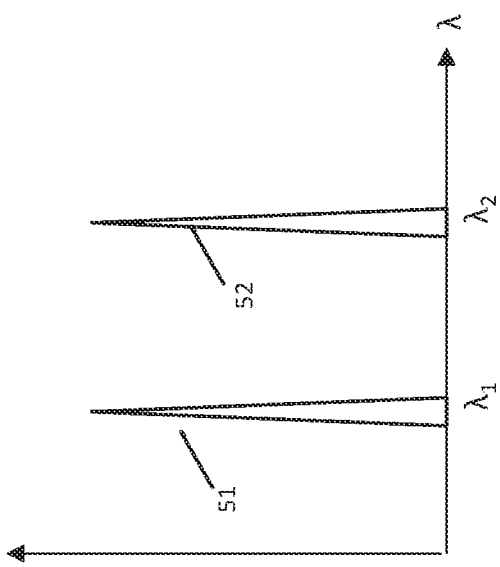
FIG. 7 is a plot showing two waveforms with different central wavelengths.

Referring now to FIG. 7 shown is graph of fourth waveform 51 with a wavelength $\lambda_1$ and fifth waveform 52 with a wavelength $\lambda_2$. During amplification, these waveforms will sample different spectral portions of the spectral gain profile of fiber amplifier 22, and therefore the optical power gain for the two waveforms may be different. Nonetheless, the fourth and fifth waveforms (collectively undergoing amplification as sixth waveform 53) can be co-amplified to form seventh waveform 54, which is coupled into fiber 42.

In general, the difference between $\lambda_1$ and $\lambda_2$ can be selected based on the spectral properties of radiation source 12 and the spectral gain profile of fiber amplifier 22, among other factors. For example, $(\lambda_2-\lambda_1)$ can be 0.2 nm or more (e.g., 0.3 nm or more, 0.4 nm or more, 0.5 nm or more, 1.0 nm or more, 1.5 nm or more, 2.0 nm or more, 2.5 nm or more, 3.0 nm or more, 4.0 nm or more, 5.0 nm or more, or even more). In general, if the difference in wavelengths is too small, it is possible that both waveforms will deplete the gain in a common spectral region of the amplifier, reducing the overall optical power of the combined amplified output waveforms at location 30. Conversely, if the difference in wavelengths is too large, it is possible that one or both waveforms will be amplified toward an edge of the amplifier's gain profile (i.e., where gain is less efficient), thereby limiting the amplification that can be achieved.

For fourth and fifth waveforms 51 and 52 that are orthogonally polarized and/or which differ in wavelength, the waveforms can be simultaneously co-amplified in fiber amplifier 22. However, when fourth and fifth waveforms 51 and 52 have similar spectral and polarization properties—or, more generally, as an alternative to simultaneous amplification regardless of the properties of fourth and fifth waveforms 51 and 52—the waveforms can be amplified in alternating, time-multiplexed fashion within fiber amplifier 22. For purposes of time-multiplexed amplification, a temporal or phase offset can be introduced between waveforms 51 and 52 (e.g., by first and second modulators 16 and 18) such that the waveforms are temporally separated, even though they co-propagate spatially.

Figure 8:
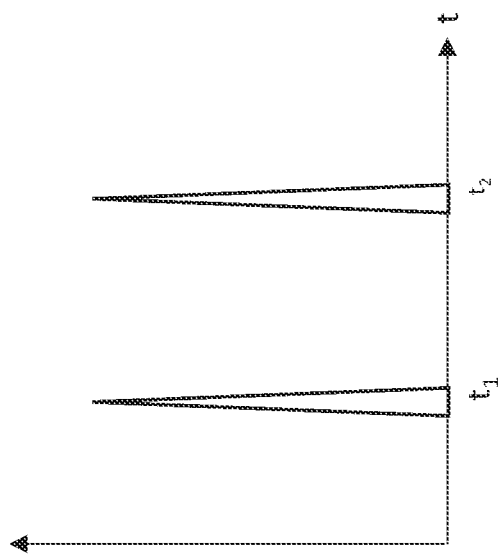
FIG. 8 is a schematic plot showing two waveforms that are temporally offset.

Referring now to FIG. 8 shown are fourth and fifth waveforms 51 and 52, with their maximum intensities occurring at different times $t_1$ and $t_2$ relative to an arbitrary reference time. Fourth waveform 51 leads fifth waveform 52 temporally as the waveforms propagate through fiber amplifier 22.

By implementing time-multiplexed amplification within fiber amplifier 22, gain depletion due to amplification of fourth waveform 51 can be replenished in the interval $(t_2-t_1)$ before fifth waveform 52 is amplified, ensuring that both waveforms can be amplified to relatively high optical power. The choice of interval $(t_2-t_1)$ will depend on the nature of fiber amplifier 22, and in particular, the gain medium and the optical pumping source. In some embodiments, for example, $(t_2-t_1)$ can be 1 ps or more (e.g., 5 ps or more, 10 ps or more, 15 ps or more, 20 ps or more, 25 ps or more, 50 ps or more, 75 ps or more, 100 ps or more, 200 ps or more, 300 ps or more, 500 ps or more, 750 ps or more, 1 ns or more, 2 ns or more, 5 ns or more, or even more).

In general, fiber amplifier 22 can be implemented in a variety of ways. As one example, commercially available fiber amplifiers can be used to implement fiber amplifier 22. Suitable amplifiers include, but are not limited to, the YLR-SM series of fiber laser systems (available from IPG Photonics, Oxford, MA), and the SPADE fiber amplifier (available from Coherent, Inc. (Santa Clara, CA).

It should be understood that while fiber amplifier 22 is used in system 10 to amplify waveforms, other types of amplifiers can also be used as an alternative to, or in addition to, fiber amplifier 22. In other words, in some embodiments, system 10 can include a non-fiber amplifier in place of fiber amplifier 22, and in certain embodiments, system 10 can include both fiber amplifier 22 and a non-fiber amplifier.

A wide variety of different types of non-fiber amplifiers, using different types of gain media and architectures, can be used in system 10. Examples of such amplifiers include, but are not limited to: amplifiers that include crystalline rod-like gain media such as YAG, YLF (Neodymium-doped yttrium lithium fluoride), and various tungstate materials, doped with materials such as, for example, rare earth elements (e.g., Nd (Neodymium), Yb (Ytterbium), Er (Erbium), Tm (Thulium), and Ho (Holmium)); amplifiers with alkali-based gain media (e.g., diode-pumped alkali lasers, DPALs, with alkali vapor gain media such as Rb (Rubidium), K (Potassium), Cs (Cesium); chemical lasers and amplifiers, including chemical oxygen iodine lasers (COILs) and hydrogen fluoride/deuterium fluoride (HF/DF) lasers and amplifiers; and excimer lasers and amplifiers that use gain media such as XeCl (Xenon Chloride), XeF (Xenon Fluoride), ArF (Argon Fluoride), and KrF (Krypton Fluoride).

After seventh waveform 54—which corresponds to amplified fourth and fifth waveforms 51 and 52—is transported to second separator 24, the second separator 24 splits seventh waveform 54 into first and second amplified waveforms 55 and 56. For amplified waveforms with orthogonal linear polarizations, or for amplified waveforms with different wavelengths, second separator 24 can include a polarization or wavelength-dependent beam splitting element, as described above in connection with first combiner 20 and shown in FIG. 5.

For amplified waveforms that are temporally, or phase-delayed with respect to one another, but otherwise have a common polarization and wavelength, a variety of different gating techniques can be used to separate the waveforms. For example, in some embodiments, an electro-optic switch, gated electronically by controller 70, can be used to separate the first and second amplified waveforms by selectively diverting one of the two waveforms along a different optical path.

As discussed above in connection with first combiner 20, combinations of multiple components—including any of the components described herein—can also be used to separate amplified waveforms. For example, a combination of polarization- and wavelength-dependent beam splitting elements can be used. Combinations of multiple components can be useful in embodiments where more than two amplified waveforms are generated (e.g., amplified waveforms with one of two different, linearly orthogonal polarization states and one of two different wavelengths).

Amplified waveforms 55 and 56 are coupled into fibers 44 and 46 and delivered to first and second beam directing optics 26 and 28, respectively. In general, beam directing optics 26 and 28 can include a variety of lenses, mirrors, beam splitters, and other optical elements arranged to direct amplified waveforms 55 and 56 to positions 31a and 31b, respectively, at location 30. In some embodiments one or both of beam directing optics 26 and 28 can include polarization adjusting optical elements (such as one or more wave plates) to adjust the polarizations of amplified waveforms 55 and/or 56. For example, when amplified waveforms 55 and 56 have orthogonal linear polarization states, beam directing optics 26 or 28 (or both) can include one or more polarization adjusting optical elements to adjust the polarization of one of waveforms 55 and 56 so that at location 30, each of the amplified waveforms has the same polarization. Alternatively, the polarizations of amplified waveforms 55 and 56 can be maintained such that at location 30, the two amplified waveforms have orthogonal linear polarizations.

More generally, in certain embodiments, beam directing optics 26 and/or 38 (and any other sets of beam directing optics that are present) can be configured such that at location 30, the amplified waveforms each have one of two or more (e.g., three or more, four or more, five or more, six or more, seven or more, eight or more, or even more) different polarization states. The group of polarization states can be linear, cylindrical, elliptical, and combinations thereof. Combinations of different polarization states can be useful, for example, to irradiate targets which exhibit a polarization-dependent response to radiation.

Detection sub-system 60 generally includes one or more radiation-sensitive detectors that measure light (corresponding to one or more of the amplified waveforms) reflected from location 30, from target plane 33 (e.g., from a target located at target plane 33), or from another location. Alternatively, or in addition, detection sub-system 60 can include a separate illumination source that directs light to location 30, to a target located at target plane 33, or to another location, and one or more radiation-sensitive detectors that measure reflected light from the separate illumination source. The detectors generate electrical signals that are transmitted to controller 70 in response to the reflected light. Suitable detectors include, but are not limited to, photodiodes (including avalanche photodiodes), photomultipliers, and charge-coupled devices (CCDs).

Detection sub-system 60 can measure various properties of the output waveform at location 30. In some embodiments, for example, detection sub-system 60 measures a portion of the output waveform that is reflected from an object or target at location 30. In certain embodiments, detection sub-system 60 measures a portion the output waveform that does not reach location 30. Properties of the output waveform that can be measured by detection sub-system 60 include, but are not limited to, an amplitude of the output waveform, a phase of the output waveform, and a polarization of the output waveform.

Where the output waveform is generated by directing N amplified waveforms to location 30, in some embodiments, detection sub-system 60 can be configured to make at least N independent measurements of the output waveform to generate electrical signals that are used by control 70 to adjust the properties of the amplified waveforms. Some or all of the N independent measurements can correspond to different spatial positions at location 30. For example, the N independent measurements can correspond to different spatial locations within the beam profile of the output waveform at location 30.

In some embodiments, detection sub-system 60 can include a single detection element that measures reflected light from a target positioned at target plane 33, and transmits an electrical signal to controller 70 that includes information about the reflected light (e.g., reflected light amplitude, phase, polarization, wave front orientation, or any other information). Controller 70 can use the information encoded in the electrical signal as input information for a matrix optimization algorithm such as a Stochastic Parallel Gradient Descent (SPGD) algorithm. The algorithm can control modulators 16 and/or 18 to adjust at least one of the phase, polarization, optical path length, spectral line width, wave front orientation, and other parameters of the waveforms subject to particular optimization criteria (as one example, to maximize the peak irradiance at target plane 33).

In some embodiments, system 10 can include multiple radiation sources. When multiple radiation sources are present, each source can generate a first waveform that has similar polarization and spectral properties, or at least some of the radiation sources can generate first waveforms with different polarization and/or spectral properties.

Figure 9:
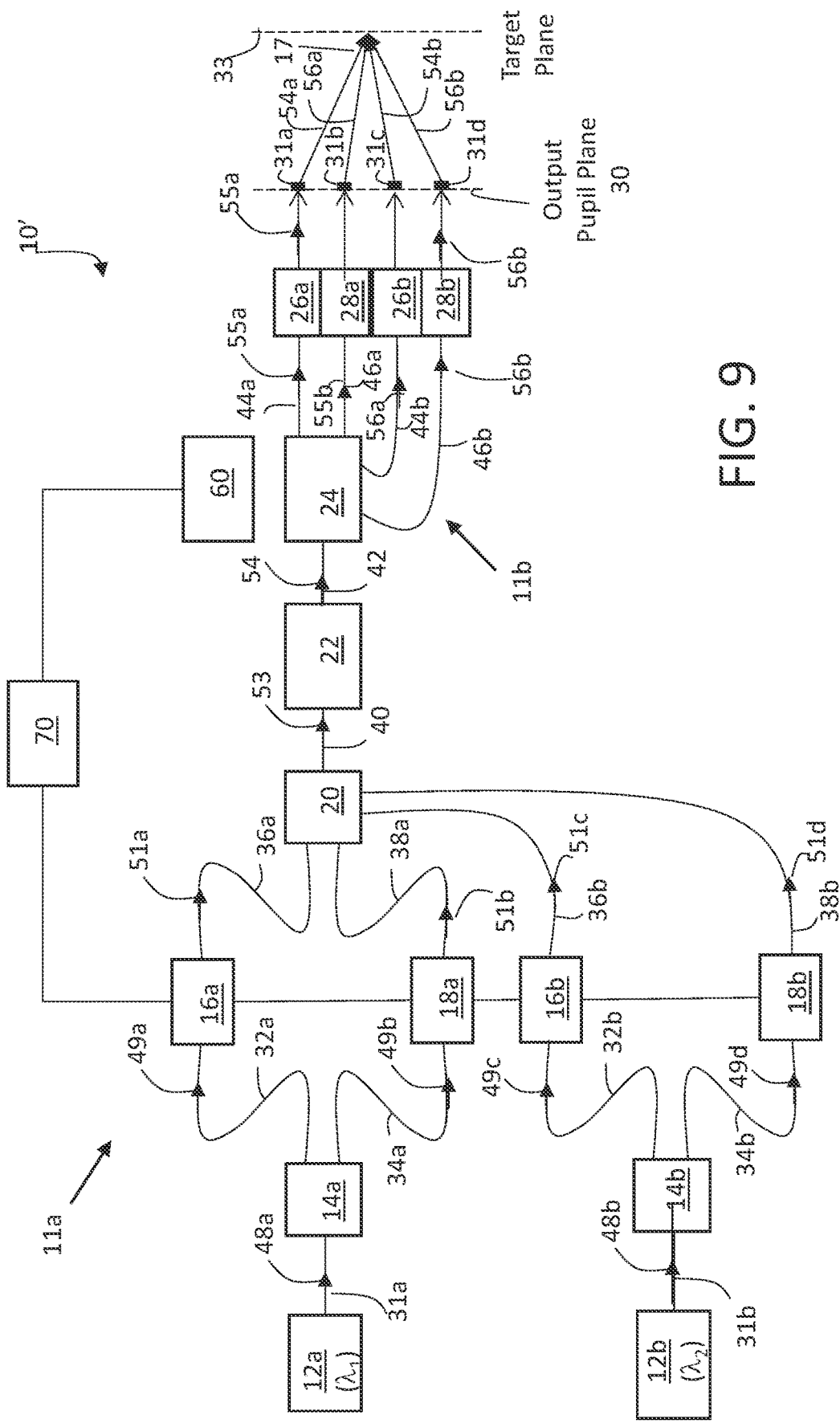
FIG. 9 is a schematic diagram showing an example system that generates high-power output waveforms with two radiation sources.

Referring now to FIG. 9, an example of system 10' that includes two radiation sources 12a and 12b is shown. In general, the components of FIG. 9 are similar to those of FIG. 1, and are designated with similar numerical labels, but include suffixes a, b, c, and d, as needed. It should be understood that the descriptions of these components in connection with FIG. 1 above apply similarly to the corresponding components of FIG. 9. For components that are not mentioned in FIG. 9, the reader should refer to FIG. 1.

Each radiation source 12a and 12b in FIG. 9 is coupled to an optical train that generates two amplified waveforms. The amplified waveforms generated by the optical train coupled to radiation source 12a are directed to positions 31a and 31b at location 30, while the amplified waveforms generated by the optical train coupled to radiation source 12b are directed to positions 31c and 31d at location 30.

Radiation source 12a generates a first waveform 48a having a wavelength $\lambda_1$, while radiation source 12b generates a second waveform 48b having a wavelength $\lambda_2$ that is different from $\lambda_1$. Each of the first and second waveforms is separated by one of first separators 14a and 14b into second and third waveforms 49a, 49b and 49c, 49d each having orthogonal linear polarizations. The second and third waveforms 49a, 49b and 49c, 49d are each modulated by one of modulators 16a, 18a, 16b, and 18b, yielding fourth and fifth waveforms 51a, 51b and 51c, 51d in each optical train. The various components of system 10' are optically coupled by fibers 31a, 31b, 32a, 32b, 34a, 34b, 36a, 36b, 38a, 38b, 40, 42, 44a, 44b, and 46a, 46b.

The fourth and fifth waveforms 51a, 51b and 51c, 51d are combined by first combiner 20 into a sixth waveform 53, and co-amplified in fiber amplifier 22. The fourth and fifth waveforms 51a, 51b and 51c, 51d correspond to four different combinations of wavelength and polarization. Thus, the fourth and fifth waveforms 51a, 51b generated by the optical train connected to radiation source 12a correspond to linear polarization states in the first and second directions, and each waveform has a wavelength $\lambda_1$. The fourth and fifth waveforms 51c, 51d generated by the optical train connected to radiation source 12b correspond to linear polarization states in the first and second directions, and each waveform has a wavelength $\lambda_2$.

Collectively referred to as a sixth waveform 53, the fourth and fifth waveforms 51a, 51b and 51c, 51d generated by the two optical trains are co-amplified within fiber amplifier 22, and provide amplified waveform 54 is separated by second separator 24 providing waveforms 55a, 55b and 56a, 56b and coupled into four different optical fibers 44a, 46a, 44b, and 46b. Each of the four amplified waveforms is directed by a different set of beam directing optics 26a, 28a, 26b, and 28b to a different position at location 30.

In FIG. 9, the system 10' for amplification includes the single amplifier 22. However, in other implementations the system 10' for amplification consists essentially of the amplifier 22.

In FIG. 9, sixth waveform 53, which includes or in some implementations consists essentially of the combination of fourth waveforms 51a, 51b and fifth waveforms 52a, 52b, is amplified by fiber amplifier 22. In other words, fourth waveforms 51a, 51b and fifth waveforms 52a, 52b, which have different properties and propagate independently within fiber 40, even though they are represented collectively as sixth waveform 53, are each independently amplified within fiber amplifier 22.

To separate the four amplified waveforms 55a, 55b, 56a, and 56b (with different combinations of linear polarization and wavelength), second separator 24 can include both polarization and wavelength-sensitive elements. For example, in some embodiments, second separator 24 can include a polarizing beam splitter to spatially separate amplified waveforms with different linear polarizations, and one or more dispersive optical elements (such as prisms or gratings) to spatially separate amplified waveforms with different wavelengths.

In some embodiments, multiple radiation sources and optical trains—each having a configuration similar to system 10 in FIG. 1, can be connected to a common controller 70 and used to generate amplified waveforms which are directed to different positions at location 30. The number of amplified waveforms that can be directed to location 30 is limited generally only by design constraints involving system size and weight. Thus, for example, the number of waveforms that can be directed to location 30 can be 2 or more (e.g., 4 or more, 6 or more, 8 or more, 10 or more, 18 or more, 24 or more, 30 or more, 36 or more, 48 or more, 60 or more, 72 or more, 144 or more, or even more).

In general, the number of fiber amplifiers used to generate the amplified waveforms at location 30 is smaller than the number of amplified waveforms. Fiber amplifier 22 (see FIG. 1) co-amplifies the fourth and fifth waveforms, and the corresponding amplified waveforms are projected onto location 30. Accordingly, in certain embodiments, where the amplified waveforms correspond to two different polarization states and a common wavelength, or to two different wavelengths and a common polarization state, for N amplified waveforms that are generated, N/2 fiber amplifiers are present in system 10.

As another example, as shown in FIG. 9, fiber amplifier 22 co-amplifies four different waveforms 51a-51d, each corresponding to a different combination of wavelength and polarization state, and the corresponding amplified waveforms are projected onto location 30. Accordingly, in certain embodiments where the amplified waveforms correspond to two different polarization states and two different wavelengths, for N amplified waveforms that are generated, N/4 fiber amplifiers are present in system 10.

More generally, while the number of polarization state degrees of freedom p in system 10' is generally 1 or 2, the number of wavelength degrees of freedom w (i.e., the number of waveforms of different wavelength that can be co-amplified in a fiber amplifier) is nominally unlimited (e.g., 1, 2, 3, 4, 5, 6, 7, 8, 9, 10, or even more than 10), and the number of temporal or phase degrees of freedom t (i.e., the number of time-multiplexed waveforms that can be co-amplified in a fiber amplifier) is nominally unlimited (e.g., 1, 2, 3, 4, 5, 6, 7, 8, 9, 10, or even more than 10). As a result, the total number of degrees of freedom is p×w×t, and a single fiber amplifier can be used to generate (p×w×t) amplified waveforms, each having a different combination polarization, wavelength, and temporal or phase offset.

As certain systems can be configured to generate amplified waveforms with degenerate combinations of polarization, wavelength, and temporal or phase properties, in some embodiments, for N amplified waveforms that are generated, the number of fiber lasers present in system 10' is N/2 or less (e.g., N/3 or less, N/4 or less, N/5 or less, N/6 or less, N/7 or less, N/8 or less, or even less).

Output Arrays of Amplified Waveforms

Each of the amplified waveforms generated by systems 10 or 10' is directed to a different position at location 30 to generate an output waveform that is a composite of the amplified waveforms. In some embodiments, the amplified waveforms are positioned randomly at location 30. In certain embodiments, however, the amplified waveforms are positioned in a regular pattern at location 30. These arrangements form a partially or fully combined waveform spot at target plane 33. Physical overlap of the individual amplified waveforms (e.g., from locations 31a, 31b, etc.) at target plane 33 increases the irradiance at target plane 33. Irradiance is further increased if the amplified waveforms are combined coherently. For example, for N amplified waveforms of equal power at location 30 that are coherently combined at target plane 33, the total irradiance at target plane 33 scales in proportion to $N^2$.

A number of different patterns of amplified waveforms can be generated by system 10 or system 10'. In some embodiments, for example, the amplified waveforms form an array pattern at the output pupil defined by location 30. The array pattern scan be square, rectangular, triangular, hexagonal, or any other regular or irregular arrangement. In certain embodiments, hexagonal array patterns can be advantageous, as they allow amplified waveforms to be closely positioned at the output pupil, combining to generate a relatively high fill factor.

In some embodiments, a hexagonal array of amplified waveforms forms the output waveform at location 30. Each of the amplified waveforms represents a sub-aperture of the output waveform.

FIG. 10 shows a schematic diagram of an output waveform 100 that is a composite of 18 amplified waveforms (greyed hexagons) at location 30, each of which forms a sub-aperture of waveform 100. The sub-aperture amplified waveforms in FIG. 10 each have a common polarization and wavelength. For the output waveform 100 to include a total optical power of 45 kW, each of the sub-aperture amplified waveforms has an optical power of 2.50 kW.

FIG. 11 shows a schematic diagram of another output waveform 102 that is a composite of 36 amplified waveforms at location 30. Each of the 36 sub-aperture waveforms in FIG. 11 has a common wavelength and one of two linear polarizations 102a (vertical arrows) or 102b (horizontal arrows). Further, the maximum transverse dimension (e.g., diameter) of each of the 36 sub-aperture waveforms is approximately half as large as the maximum transverse dimension of each of the 18 sub-aperture waveforms in FIG. 10.

Increasing the number of sub-aperture waveforms in output waveform 102 relative to waveform 100 in FIG. 10 can provide a number of advantages. As explained above, by reducing the transverse dimension of the sub-aperture waveforms, the ability of system 10 or system 10' to compensate for atmospheric turbulence and other perturbations as a result of propagation of the sub-aperture amplified waveforms from system 10 or system 10' to location 30 can be significantly enhanced. This is an important consideration for directed energy weapon systems, for example, where the output waveform may travel many hundreds (or even thousands) of meters before reaching its target.

Further, by increasing the number of sub-aperture amplified waveforms, each output waveform can have reduced optical power, relative to the sub-aperture waveforms in FIG. 10, while the same total optical power of the output waveform can still be achieved. For example, in FIG. 11, each sub-aperture amplified waveform can have 1.25 kW of optical power, and the output waveform has a total of 45 kW of optical power, the same power level as in FIG. 10. By operating system 10 or system 10' at lower amplified power levels, the likelihood of photorefractive and thermal damage to components of the system can be reduced, which reduces component cost and long-term maintenance costs, and also reduces the amount of time invested in system maintenance.

In general, the positioning of sub-aperture amplified waveforms with different polarization states can be selected as desired for particular applications. In some embodiments, the different polarization states can be randomly oriented at location 30. In certain embodiments, particular arrangements are generated.

FIG. 11 shows sub-aperture amplified waveforms having one linear polarization 102a that are clustered around the center of the output waveform, while sub-aperture amplified waveforms having a second, orthogonal linear polarization 102b are positioned closer to the peripheral regions of the output waveform.

FIG. 12 show another example of an output waveform 104 at location 30. In waveform 104, 18 sub-aperture amplified waveforms 104a having one linear polarization are positioned on one side of waveform 104, while 18 sub-aperture amplified waveforms 104b having a second, orthogonal linear polarization are positioned on the other side of waveform 104.

In some embodiments, as discussed above, first beam directing optics 26 and/or second beam directing optics 28 can include one or more polarization rotating elements such that even if amplified waveforms 55 and 56 correspond to different polarization states, the polarization states of the amplified waveforms are rotated to a common orientation at location 30.

FIG. 13 shows an output waveform 106 that includes 36 sub-aperture amplified waveforms 106a, as in FIG. 12. In FIG. 13, each of the sub-aperture amplified waveforms 106a has a common linear polarization. In some embodiments, the sub-aperture amplified waveforms 106a that form the output waveform have different combinations of both polarization and wavelength.

FIG. 14 shows an output waveform 108 that includes 36 sub-aperture waveforms. Each of the sub-aperture waveforms corresponds to one of two different polarization orientations 108a, 108b and one of two different wavelengths 108c, 108d. The different wavelengths are indicated by the two groups of differently shaded regions 108c (white), 108d (grey), while the different polarizations are indicated by the two groups of differently oriented arrows 108a (horizontal arrows), 108b (vertical arrows).

Figure 15:
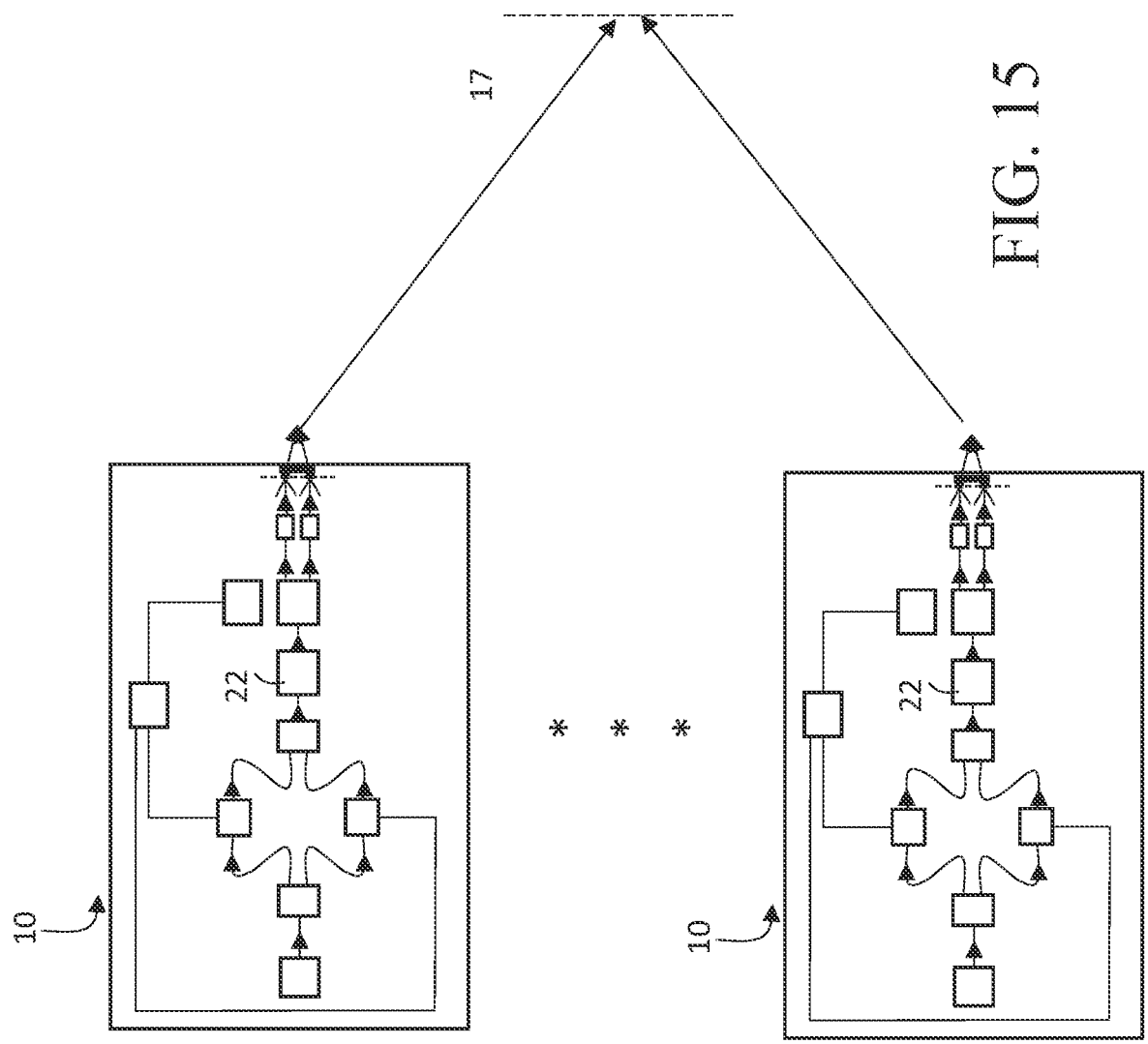
FIG. 15 is a schematic showing the combination of two or more multiplexed fiber laser systems to interact on a single target.

As shown in FIG. 15, in certain embodiments, output waveform 106 in FIG. 13 can be generated by a system 10a that includes 18 fiber amplifiers (each within a system 10, FIG. 1). Each of the fiber amplifiers 22 (two of which are shown in FIG. 15) amplifies two waveforms with orthogonal linear polarizations, as shown in FIG. 1, for example, and operates at a combined power of 2.5 kW to generate 45 kW of total output power.

Output waveform 108 in FIG. 14 can be generated by a system 10 that includes 9 fiber amplifiers. Each of the fiber amplifiers amplifies four different waveforms, each having a different combination of wavelength and polarization state, as shown in FIG. 9. Each fiber amplifier operates at a combined power of 5.0 kW to generate 45 kW of total output power.

A system 10 featuring 18 fiber amplifiers, each operating at 5 kW combined power, can also be used to generate 90 kW of total output power in an output waveform with 72 sub-aperture amplified waveforms, each of which has 1.25 kW of optical power, and each of which corresponds to a combination of one of two different linear polarization states and one of two different wavelengths. Each of the fiber amplifiers amplifies four different waveforms, each having a different combination of wavelength and polarization state, as shown in FIG. 9.

In general, total output powers that can be generated in the output waveform are limited by various photorefractive and thermal damage thresholds for the various components in system 10. As discussed previously, because the sensitive optical components of first and second modulators 16 and 18 are not exposed to high power waveforms, the total output powers that are achievable are larger than in some conventional systems. For example, in certain embodiments, system 10 can generate a total output power in the output waveform of 20 kW or more (e.g., 25 kW or more, 30 kW or more, 35 kW or more, 40 kW or more, 45 kW or more, 50 kW or more, 60 kW or more, 70 kW or more, 80 kW or more, 90 kW or more, 100 kW or more, 120 kW or more, 140 kW or more, 160 kW or more, 180 kW or more, 200 kW or more, 250 kW or more, or even more).

Co-Amplification in Fiber Amplifiers

Combining amplified waveforms from fiber amplifiers to generate output waveforms provides a direct route to achieving high output power. When scaling output power upward using this approach, a number of factors limit the realizable power, including power limitations associated with each fiber amplifier, and achievable polarization control, temporal offset/path length, and phase control for each fiber channel. For single-mode, polarized, narrow-linewidth fiber amplifiers, output power scaling in the amplifier is generally limited by induced nonlinear phenomena. The onset of nonlinear phenomena will curtail further amplification of the laser signal in a single-mode fiber amplifier. Processes including Stimulated Brillouin Scattering (SBS), Stimulated Raman Scattering (SRS), Four-Wave Mixing (FWM), and Self-Phase Modulation (SPM) are all related to the intensity of the optical mode within the fiber core. Normal, single-mode fiber laser cores are on the order of 5 microns to 10 microns in diameter. For a 1-kilowatt fiber amplifier output, this creates intensities of 5.1- to 1.3-Gigawatts per square centimeter, respectively. When combined with the narrow linewidth desired for efficient beam combining, the threshold for onset of nonlinear processes is typically exceeded beyond a few hundred Watts.

To suppress onset of nonlinear behavior, the Mode Field Diameter (MFD) within the fiber core can be enlarged. Larger MFD configurations dramatically reduce the core intensities. A 20-micron diameter core would reduce the output intensity to 318 MW/cm$^2$; increasing the core to a 40-micron diameter would further decrease the peak intensity to below 80 MW/cm$^2$ for a 1-kW fiber output. These dramatic reductions of optical intensity can allow power scaling to about 3 kW optical power.

To further scale up power per fiber amplifier, as discussed herein, co-amplification of multiplexed waveforms can be used. Multiplexing waveforms allows the power in each single-mode signal to be reduced, thereby permitting further upward power scaling before the onset of nonlinear phenomena.

Among the various nonlinear phenomena described above, the onset of SBS in the amplifier fiber constitutes the primary limitation to continued upward power scaling. SBS occurs when the optical intensity, linewidth, polarization purity, and material properties of the amplifier fiber core reach the critical combination of parameters and the internal, thermal-acoustic waves generated with the fiber core create an effective Bragg grating that causes a back-reflection of the optical mode. Once that mode is formed, the reverse propagation wave is amplified, robbing energy from the forward mode, and potentially causing damage near the input end of the fiber amplifier. If multiple optical modes are co-propagating inside of the fiber core, then each mode individually reaches the optical intensity, linewidth, and polarization purity limits to induce the SBS reverse mode behavior. Measurements have shown that mode behavior from different wavelengths is independent if the wavelengths are sufficiently separated spectrally, and orthogonal polarization states are also independent when approaching SBS threshold conditions. By performing co-amplification of waveforms with different wavelengths and polarization states in a fiber amplifier, each waveform can be separately scaled up in power under the SBS threshold is reached for all waveforms. Thus, multiplexed co-amplification can provide a convenient route to increase output power, while avoiding SBS within a fiber amplifier.

Another nonlinear phenomenon that appears to limit power scaling in fiber lasers is Stimulated Thermal Rayleigh Scattering (STRS), which has been observed to occur when multiple optical modes in an amplifier fiber interact with thermal gratings generated near the fiber core. Thermal Mode Instability (TMI) occurs when high-power optical modes interact with thermal waves in the fiber. The STRS influence arises from a single, high-power mode that couples with mode noise and generates conditions suitable for STRS generation. The generation of TMI leads to degradation in the beam quality of the fiber output, thus reducing the ability to focus high irradiance on a location or target in the optical far field. Co-amplification of waveforms with linearly polarized, orthogonal polarization states allows nearly double the power output from a fiber amplifier before the onset of TMI due to STRS, because optical mode powers within the fiber amplifier are maintained at lower levels rather in a single, high-power mode.

The onset of Higher-Order Mode (HOM) behavior, which also appears to be due to TMI effects, also establishes a clear and relatively sensitive upper limit on output power. The Figure-Of-Merit used to establish experimentally the onset of HOM behavior was is a dramatic increase in the M$^2$ (beam quality) parameter. It has been speculated that the fundamental mode exists in a Gaussian spatial intensity distribution in the inner region of the fiber core, which creates a hole-burning in the fiber amplifier gain profile, depleting gain near the center of the fiber and leaving higher gain toward the wings of the gain profile, which overlaps with the LP01 mode. This results in amplification of the HOM signal, creating a mode competition between the fundamental (single-mode) and HOM propagation. By co-amplifying multiple waveforms in a fiber amplifier, the maximum optical power in each waveform can be reduced (while maintaining the same total power output), which avoids gain depletion near the center of the fiber and possible onside of HOM competition behavior.

Thermal Modal Instabilities (TMI) have also been examined within large MFD fiber cores, it is speculated that thermal gratings generated in the amplifier fiber can couple with two or more modes to create a modal instability whose onset is related to the power levels, MFD size, wavelength, and several other physical parameters. The behavior corresponds to a modal instability between the LP01 and LP11 modes, driven in part by the transient thermal profiles generated by the quantum inefficiency of the lasing process and resulting temperature profiles generated within the fiber core. These TMI mode competition effects are triggered when the modal power in the LP01 mode reaches the threshold for onset of the instabilities. Thus, by co-amplifying multiple waveforms in a fiber amplifier—each of which corresponds to a different LP01 mode, with a different wavelength and/or polarization—each of the multiple waveforms reaches the same threshold modal power to trigger the onset of TMI mode competition. By co-amplifying multiple waveforms, the optical power of each waveform can be reduced (while achieving the same or greater total output power), thereby limiting TMI mode competition in the fiber amplifier.

Hardware and Software Implementations

Any of the control steps and adjustment functions described herein can be executed by controller 70. In general, controller 70 can include a single electronic processor, multiple electronic processors, one or more integrated circuits (e.g., application specific integrated circuits), and any combination of the foregoing elements. Software- and/or hardware-based instructions are executed by controller 70 to perform the steps and functions discussed herein. Each set of software-based instructions, embodied as a software program stored on a tangible, non-transient storage medium (e.g., an optical storage medium such as a CD-ROM or DVD, a magnetic storage medium such as a hard disk, or a persistent solid-state storage medium) or device, can be implemented in a high-level procedural or object-oriented programming language, or an assembly or machine language.

Controller 70 can include, or be connected to, a data storage system (including memory and/or storage elements), at least one input device, and at least one output device, such as a display. Controller 70 can display any of the information described herein on the at least one output device, and can receive information and instructions from, and transmit information to, the least one input device, including any of the information and instructions described herein.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In general, method steps described herein and in the claims can be performed in any order, except where expressly prohibited or logically inconsistent. It should be noted that describing steps in a particular order does not mean that such steps must be performed in the described order. Moreover, the labeling of steps with identifiers does not impose an order on the steps or imply that the steps must be performed in a certain sequence. To the contrary, the steps disclosed herein can generally be performed in any order except where noted otherwise.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A system, comprising:
    a waveform generation apparatus configured to generate a plurality of input optical waveforms, with at least two of the input optical waveforms comprising different polarizations;
    a single amplifier configured to amplify the plurality of input optical waveforms to generate a single output waveform; and
    a beam forming apparatus configured to separate the single output waveform into a plurality of amplified waveforms, and to direct the plurality of amplified waveforms to be incident on a target location.

2. The system of claim 1, wherein the waveform generation apparatus comprises:
    a radiation source configured to generate a first waveform; and
    a first separator configured to separate the first waveform into linearly polarized second and third waveforms, wherein polarization directions of the second and third waveforms are orthogonal.

3. The system of claim 2, wherein the waveform generation apparatus comprises:
    a first modulator configured to modulate at least one of a phase and a polarization of the second waveform to generate a fourth waveform; and
    a second modulator configured to modulate at least one of a phase and a polarization of the third waveform to generate a fifth waveform.

4. The system of claim 3, wherein the waveform generation apparatus comprises a first combiner configured to combine the fourth and fifth waveforms to generate a sixth waveform.

5. The system of claim 4, wherein the single amplifier is configured to amplify the sixth waveform to generate a seventh waveform.

6. The system of claim 5, wherein the beam forming apparatus comprises:
    a separator configured to separate the seventh waveform into a plurality of amplified waveforms; and
    beam directing optics configured to direct the plurality of amplified waveforms to form the single output waveform at the target location.

7. The system of claim 2, wherein the first waveform comprises radiation in a mixture of orthogonal, linearly polarized states.

8. The system of claim 3, wherein the first modulator comprises a polarization modulator configured to adjust a polarization of the first waveform so that the first waveform comprises radiation in a mixture of orthogonal, linearly polarized states.

9. The system of claim 1, wherein the single amplifier is a single fiber amplifier comprising an amplification fiber core doped with a gain medium.

10. The system of claim 1, further comprising:
    a measurement apparatus configured to measure at least one property of the single output waveform, and to transmit information about the measured at least one property to the waveform generation apparatus.

11. The system of claim 10, wherein the measurement apparatus is configured to measure a portion of the single output waveform reflected from an object at the target location.

12. The system of claim 10, wherein the measurement apparatus is configured to measure a portion of the single output waveform that does not reach the target location.

13. The system of claim 10, wherein the at least one property of the single output waveform comprises an amplitude of the single output waveform.

14. The system of claim 10, wherein the at least one property of the single output waveform comprises at least one of a phase of the single output waveform or a polarization of the single output waveform.

15. The system of claim 1, wherein the plurality of amplified waveforms comprises at least one of six amplified waveforms, eighteen amplified waveforms, or thirty-six amplified waveforms.

16. The system of claim 1, wherein each one of the plurality of amplified waveforms is linearly polarized in a common direction.

17. The system of claim 1, wherein a first subset of the plurality of amplified waveforms is linearly polarized in a first direction, and a second subset of the plurality of amplified waveforms is linearly polarized in a second direction that is orthogonal to the first direction.

18. The system of claim 10, wherein the wave forming apparatus is configured to receive the information about the measured at least one property of the single output waveform and to control wave front orientations of each one of the plurality of amplified waveforms based on the information.

19. The system of claim 3, wherein the first and second modulators are configured so that a phase offset exists between the fourth waveform and the fifth waveform.

20. The system of claim 3, wherein the first and second modulators are configured so that the fourth and fifth waveforms have a common phase.

21. The system of claim 1, wherein the waveform generation apparatus is configured to generate two input optical waveforms having different central wavelengths.

22. The system of claim 21, wherein the two input optical waveforms are phase locked.

23. The system of claim 22, wherein the single amplifier is configured to amplify waveforms generated from each of the two input, phase locked optical waveforms.

24. The system of claim 10, wherein the plurality of amplified waveforms comprises n amplified waveforms, with the measurement apparatus configured to make at least n independent measurements of the output waveform.

25. The system of claim 24, wherein the at least n independent measurements comprise n spatially separated measurements of the at least one property of the single output waveform.

26. The system of claim 24, wherein at least some of the at least n independent measurements correspond to different spatial locations associated with the single output waveform.

27. The system of claim 26, wherein the different spatial locations correspond to different locations within a beam profile of the single output waveform.

28. The system of claim 1, wherein the single amplifier comprises a crystalline host material doped with at least one rare earth element.

29. The system of claim 28, wherein the at least one rare earth element comprises at least one element selected from the group consisting of Nd, Yb, Er, Tm, and Ho.

30. The system of claim 1, wherein the single amplifier comprises a gain medium comprising at least one type of alkali vapor.

31. The system of claim 30, wherein the gain medium comprises at least one member selected from the group consisting of Rb vapor, K vapor, and Cs vapor.

32. The system of claim 1, wherein the single amplifier comprises at least one of a chemical oxygen iodine laser, a hydrogen fluoride/deuterium fluoride laser, or an excimer laser.

33. The system of claim 32, wherein a gain medium of the excimer laser comprises at least one member selected from the group consisting of XeCl, XeF, ArF, and KrF.

34. A system, comprising:
a radiation source configured to generate a first waveform;
a first separator configured to separate the first waveform into linearly polarized second and third waveforms, wherein polarization directions of the second and third waveforms are orthogonal;
a first modulator configured to modulate at least one of a phase and a polarization of the second waveform to generate a fourth waveform;
a second modulator configured to modulate at least one of a phase and a polarization of the third waveform to generate a fifth waveform;
a first combiner configured to combine the fourth and fifth waveforms to generate a sixth waveform;
a single amplifier configured to amplify the sixth waveform to generate a seventh waveform;
a second separator configured to separate the seventh waveform into a plurality of amplified waveforms; and
beam directing optics configured to direct the plurality of amplified waveforms to form an output waveform at a target location.

35. The system of claim 34, wherein the radiation source comprises a laser source.

36. A method, comprising:
generating, from a radiation source, a plurality of input optical waveforms, with at least two of the plurality of input optical waveforms having different polarizations;
amplifying, with a single amplifier, the plurality of input optical waveforms to generate a single output waveform; and
separating the single output waveform into a plurality of amplified waveforms that are directed to be incident on a target location.

37. The method of claim 36, wherein the plurality of input optical waveforms comprises a first waveform, the method further comprising:
separating the first waveform into linearly polarized second and third waveforms that are orthogonal;
modulating at least one of a phase and a polarization of the second waveform to generate a fourth waveform; and
modulating at least one of a phase and a polarization of the third waveform to generate a fifth waveform.

38. The method of claim 37, further comprising:
combining the fourth and fifth waveforms to form a sixth waveform.

39. The method of claim 38, further comprising:
amplifying the sixth waveform to generate a seventh waveform; and
separating the seventh waveform into a plurality of amplified waveforms.

40. The method of claim 39, further comprising:
directing the plurality of amplified waveforms to form the single output waveform at the target location.

41. The method of claim 37, further comprising:
measuring at least one property of the single output waveform; and modulating the second and third waveforms based on the measured at least one property.

42. The method of claim 41, wherein measuring comprises measuring a portion of the single output waveform reflected from an object at the target location.

43. The method of claim 41, wherein measuring comprises measuring a portion of the single output waveform that does not reach the target location.

44. The method of claim 41, wherein the at least one property of the single output waveform comprises an amplitude of the single output waveform.

45. The method of claim 41, wherein the at least one property of the single output waveform comprises a phase of the single output waveform.

46. The system of claim 1, wherein the single amplifier is configured to simultaneously co-amplify the plurality of input optical waveforms to generate the single output waveform.

47. The system of claim 1, wherein the single amplifier is configured to amplify the plurality of input optical waveforms in an alternating, time-multiplexed fashion to generate the single output waveform.

* * * * *